United States Patent
Wu

(10) Patent No.: US 9,733,427 B2
(45) Date of Patent: Aug. 15, 2017

(54) APPARATUS FOR APPLYING COMPENSATION TO DISPLAYED IMAGE AND METHOD FOR MANUFACTURING SAME

(71) Applicant: HON HAI PRECISION INDUSTRY CO., LTD., New Taipei (TW)

(72) Inventor: I-Wei Wu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/293,284

(22) Filed: Oct. 14, 2016

(65) Prior Publication Data

US 2017/0031093 A1 Feb. 2, 2017

Related U.S. Application Data

(62) Division of application No. 14/164,140, filed on Jan. 25, 2014, now Pat. No. 9,494,733.

(30) Foreign Application Priority Data

Feb. 5, 2013 (TW) .............................. 102104487 A

(51) Int. Cl.
   *G02B 6/08* (2006.01)
   *G02F 1/1335* (2006.01)
   *F21V 8/00* (2006.01)
   *G02B 6/42* (2006.01)

(52) U.S. Cl.
   CPC ............ *G02B 6/08* (2013.01); *G02B 6/0008* (2013.01); *G02F 1/133524* (2013.01); *F21V 2200/10* (2015.01); *F21V 2200/20* (2015.01); *G02B 6/001* (2013.01); *G02B 6/0078* (2013.01); *G02B 6/4204* (2013.01); *G02F 1/1335* (2013.01); *Y10T 29/49826* (2015.01)

(58) Field of Classification Search
   None
   See application file for complete search history.

(56) References Cited

U.S. PATENT DOCUMENTS

| | | | | |
|---|---|---|---|---|
| 4,759,604 A * | 7/1988 | Utsumi | ................... | C03B 37/15 385/116 |
| 6,349,572 B1 * | 2/2002 | Meinl | ................... | G02B 6/403 65/409 |
| 6,567,593 B1 * | 5/2003 | Sugawara | ......... | C03B 37/01214 385/115 |
| 2011/0255301 A1 * | 10/2011 | Watanabe | ........... | G02F 1/13336 362/558 |

* cited by examiner

*Primary Examiner* — Jerry Rahll
(74) *Attorney, Agent, or Firm* — Steven Reiss

(57) ABSTRACT

A method for manufacturing a display includes providing a plurality of light guiding fibers or other elements extending out from a display screen. The light guiding elements are in a matrix to form a first light guiding body forming a strip along the edges of each individual display screen. The first light guiding bodies form a compensating portion of an image compensating apparatus, a cross-sectional area of each light guiding element increasing from light-collecting end (closest to the display screen) to opposite light-releasing end. The compensating portion includes a light incident surface and a light emitting surface.

20 Claims, 30 Drawing Sheets

APPARATUS FOR APPLYING COMPENSATION TO DISPLAYED IMAGE AND METHOD FOR MANUFACTURING SAME

CROSS-REFERENCE TO RELATED APPLICATIONS

This application is related to a U.S. patent application Ser. No. 14/164,136 filed on Jan. 26, 2014, a U.S. patent application Ser. No. 14/164,139 filed on Jan. 25, 2014, a U.S. patent application Ser. No. 14/164,137 filed on Jan. 25, 2014, and a U.S. patent application Ser. No. 14/164,118 filed on Jan. 24, 2014. This application also claims foreign priority for application filed in Taiwan as Serial Number 102104487 on Feb. 5, 2013, and Serial No. 102135214 filed on Sep. 27, 2013. These related applications are incorporated herein by reference.

BACKGROUND

The present disclosure relates to an image compensating apparatus and manufacturing method thereof, and more particularly, to an image compensating apparatus disposed upon a display panel and manufacturing method thereof.

Display panels with thin bezels are more and more popular, thus the border of display panel tends to be manufactured more narrowed. In a display panel, some electronic components are positioned near the edge of the panel, thus even a thin bezel cannot be omitted. However, in some situations, to obtain a display panel of a relatively large size, such as more than 200 inches, a large number of displays jointed together in a plane can be serially arranged. The bezels between two adjacent display panels jointed together may interfere with a display. A bezel, or a border, should in practice be almost invisible or display panels could be jointed so as to eliminate non-display regions. For the latter, this would mean displaying larger images on a screen than the actual display region of each display panel would allow.

Therefore, there is room for improvement in the art.

BRIEF DESCRIPTION OF THE DRAWINGS

The components in the drawings are not necessarily drawn to scale, the emphasis instead being placed upon clearly illustrating the principles of at least one exemplary embodiment. In the drawings, like reference numerals designate corresponding parts throughout the various views.

DETAILED DESCRIPTION

Reference will now be made to the drawings to describe various exemplary embodiments in detail.

Figure 1:
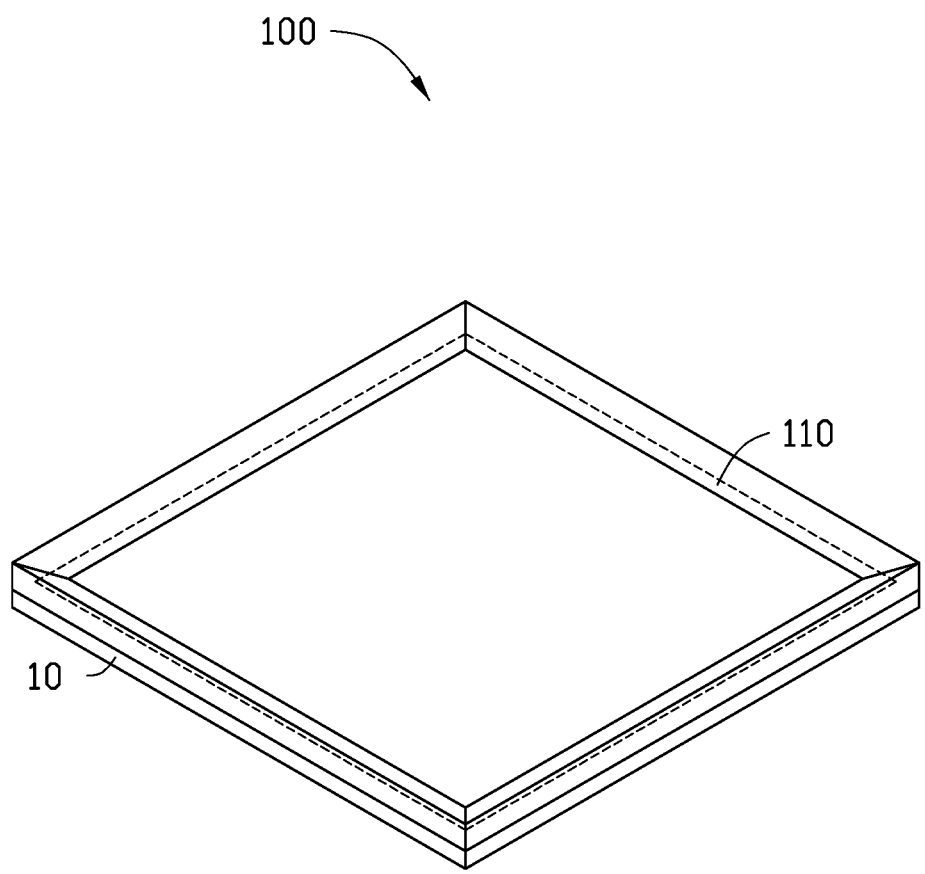
FIG. 1 a schematic, isometric view of a first exemplary embodiment of a display of the present disclosure.
Figure 2:
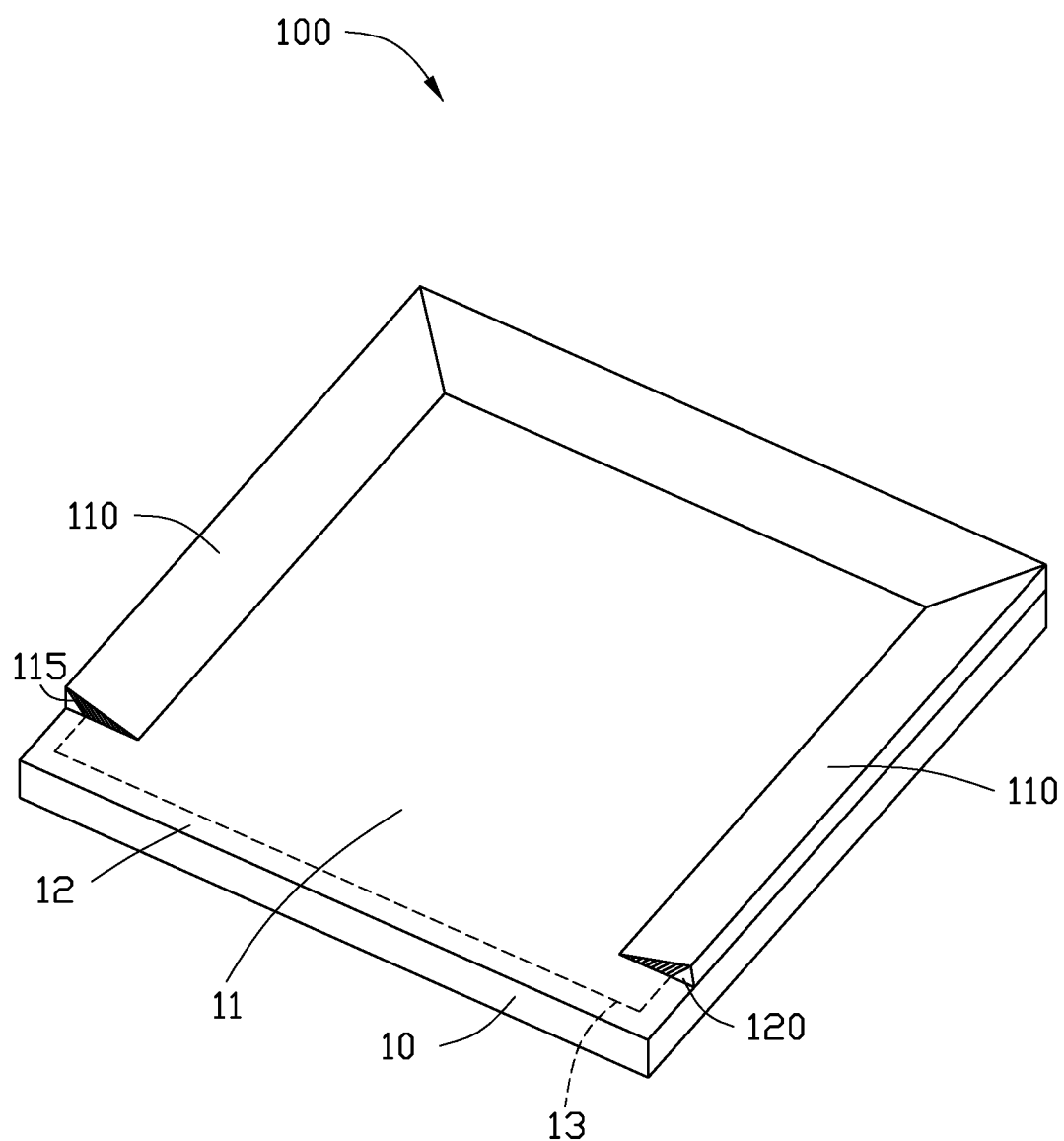
FIG. 2 is a partial cutaway view of the display in FIG. 1.
Figure 3:
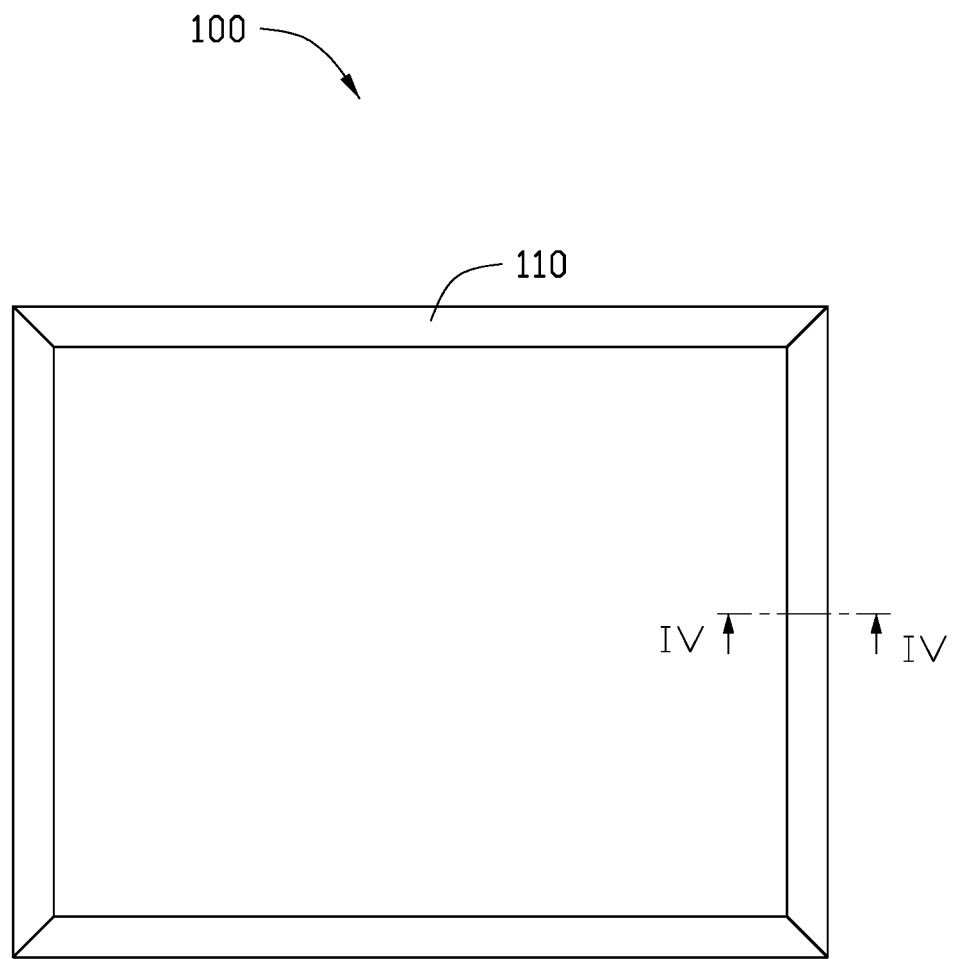
FIG. 3 is a top view of the display in FIG. 1.

FIG. 1 is a schematic, isometric view of a first exemplary embodiment of a display of the present disclosure. The display 100 includes a display panel 10, an image compensating apparatus 110 set on the display panel 10, and a support portion 120 (as shown in FIG. 2). FIG. 2 is a partial cutaway view of the display 100. The display panel 10 defines a display region 11 and a non-display region 12 surrounding the display region 11. The image compensating apparatus 110 is set on display region 11 along a border 13 between the display region 11 and the non-display region 12. A covering portion 115 of the image compensating apparatus 110 is extended from the display region 11 to cover the non-display region 12. The image compensating apparatus 110 effectively enlarges a display area of the display region 11 to cover the non-display region 12. The support portion 120 is set on the non-display region 12 to support the image compensating apparatus 110. In this exemplary embodiment, the support portion 120 abuts and supports the covering portion 115. For a joint display comprising of a number of display panels 10, the image compensating apparatus 110 is set at a border between two adjacent display panels 10. In this exemplary embodiment, there are four image compensating apparatuses 110 set on the non-display regions 12. Referring to FIG. 3, each of the image compensating apparatuses 110 is shaped as an isosceles trapezoid. The four image compensating apparatuses 110 are connected end to end to form a rectangular frame. In other alternative exemplary embodiment, the support portion (as shown in FIG. 2) can be omitted.

Figure 4:
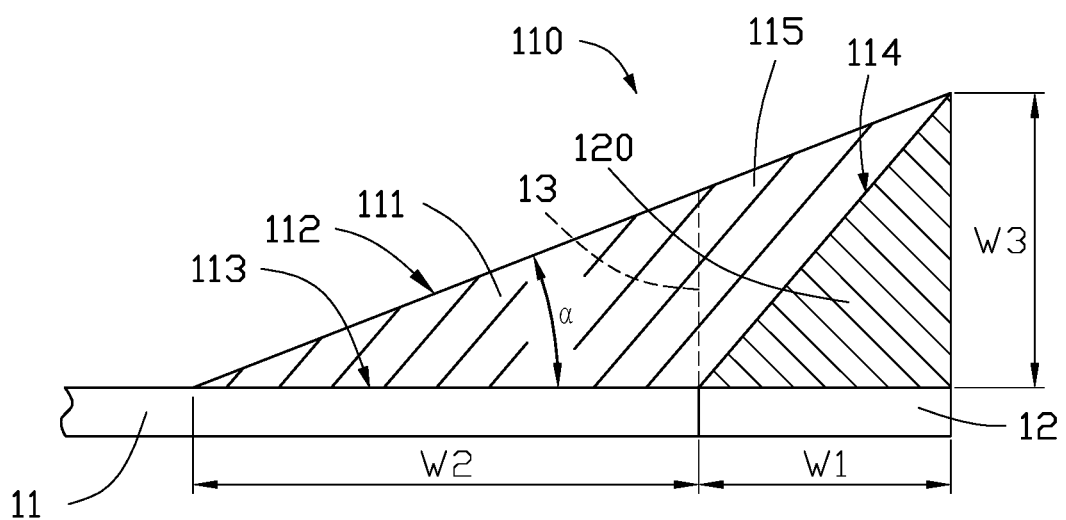
FIG. 4 is a cross-sectional view taken along line IV-IV in FIG. 3.

FIG. 4 is a cross-sectional view of the elements in FIG. 3 taken along line IV-IV. The four image compensating apparatuses 110 are set on a border 13 of the display region 11 adjacent to the non-display region 12. In FIG. 2, at each corner of the display region 11, two ends of two image compensating apparatuses 110 are connected end to end by an inclined surface of the image compensating apparatuses 110 to form a closed compensating frame. In FIG. 4, an angle α are defined between the inclined surface of the image compensating apparatus 110 and a periphery of the display 100 preferably at 45 degrees.

In this exemplary embodiment as shown in FIG. 4, the image compensating apparatus 110 is a triangular prism with a cross section shaped as an obtuse triangle. The support portion 120 is a prism with a side surface abuts the image compensating apparatus 110. The image compensating apparatus 110 includes a light emitting surface 112, a light incident surface 113, and an inclined surface 114. In this exemplary embodiment, the light incident surface 113 is a bottom surface and is in contact with the display panel 10. The light emitting surface 112 is inclined with respect to the light incident surface 113. The light incident surface 113, the light emitting surface 112, and the inclined surface 114 are connected with each other. The light incident surface 113 and the inclined surface 114 form an obtuse triangle. The obtuse angle is preferably 135 degrees. A projection of the light emitting surface 112 on the light incident surface 113 is greater than an area of the light incident surface 113.

The image compensating apparatus 110 includes a number of light guiding channels 111. In this exemplary embodiment, each of the light guiding channels 111 is a light guiding fiber. Each light guiding fiber is optically independent from other light guiding fibers, thus the light passing through each light guiding fiber does not interfere with the light passing through other light guiding fibers. Each of the light guiding fibers extends from the light incident surface 113 to the light emitting surface 112. An extending direction of the light guiding fibers is parallel to the inclined surface 114. Each of the light guiding channels 111 extends along substantially the same direction. The light guiding channels 111 are arranged as a matrix.

In this exemplary embodiment, a width of the non-display region 12 is presented as W1. The bottom width of the support portion 120 is also W1. Height of the support portion 120 and height of the image compensating apparatus 110 added together are presented as W3. A bottom width of the image compensating apparatus 110 is presented as W2. The W2 is greater than the W1. Preferably, the W2 is double the size of the W1. For example, when the W1 is 3 millimeters (mm), the W2 is 6 mm.

The display region 11 includes a number of pixels. Light from the pixels enters the image compensating apparatus 110 via the light incident surface 113 and is emitted from the light emitting surface 112. The projected area of the light emitting surface 112 over the display panel 10 is greater than the area of the light incident surface 113, an image of the display region 11 covered by the light incident surface 113 is transmitted to the light emitting surface 112 that is laid over the non-display region 12. Thus, the non-display region 12 is hidden from a viewer. The display 100 has a frame-less effect.

Figure 5:
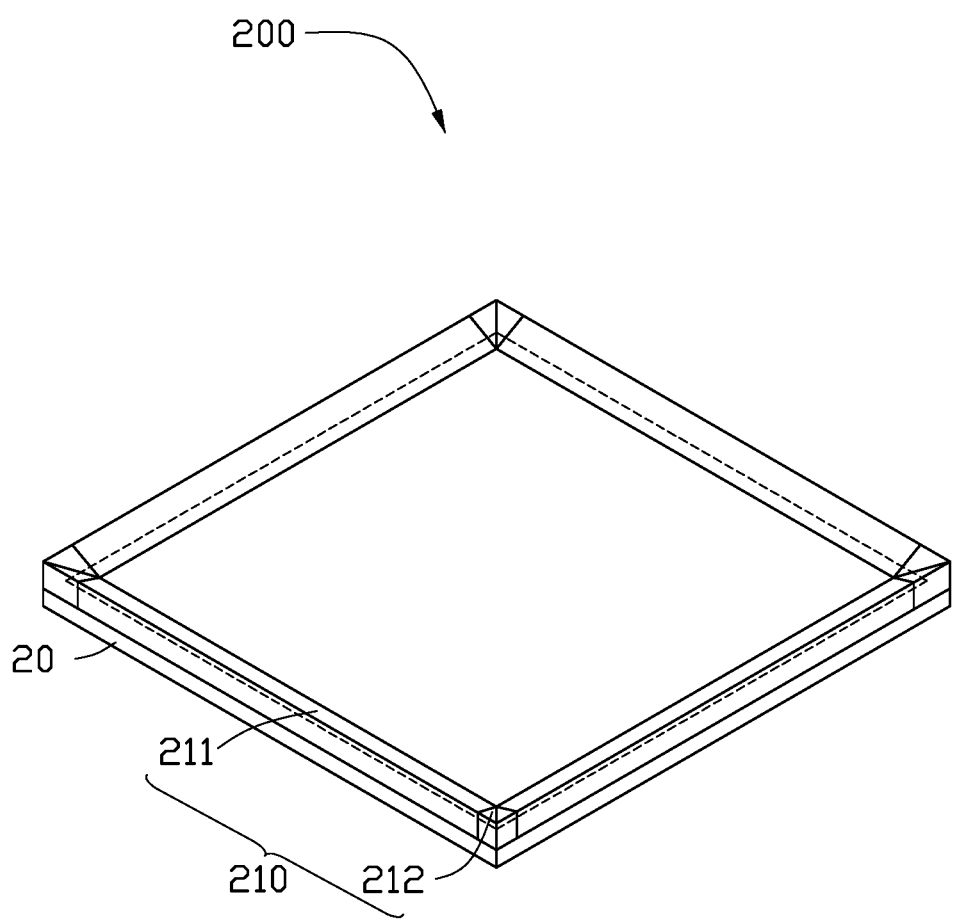
FIG. 5 is an isometric view of a second exemplary embodiment of a display of the present disclosure.

FIG. 5 shows a second exemplary embodiment of a display 200. The display includes a display panel 20 and an image compensating apparatus 210 set on the display panel 20. A difference between the image compensating apparatus 210 and the image compensating apparatus 110 is that the image compensating apparatus 210 includes a number of elongated side image compensating apparatuses 211 and a number of corner image compensating apparatuses 212. Display capabilities of four corners of the display 200 are improved by the corner image compensating apparatuses 212.

Figure 6:
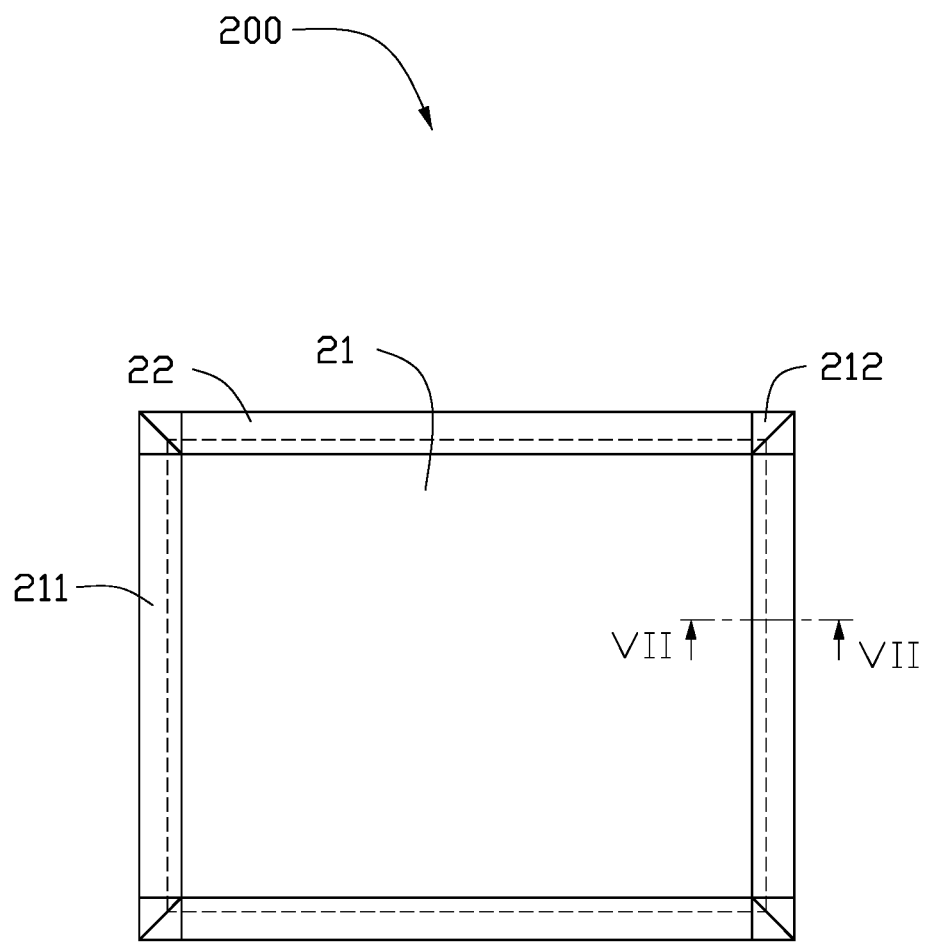
FIG. 6 is a top view of the display in FIG. 5.
Figure 7:
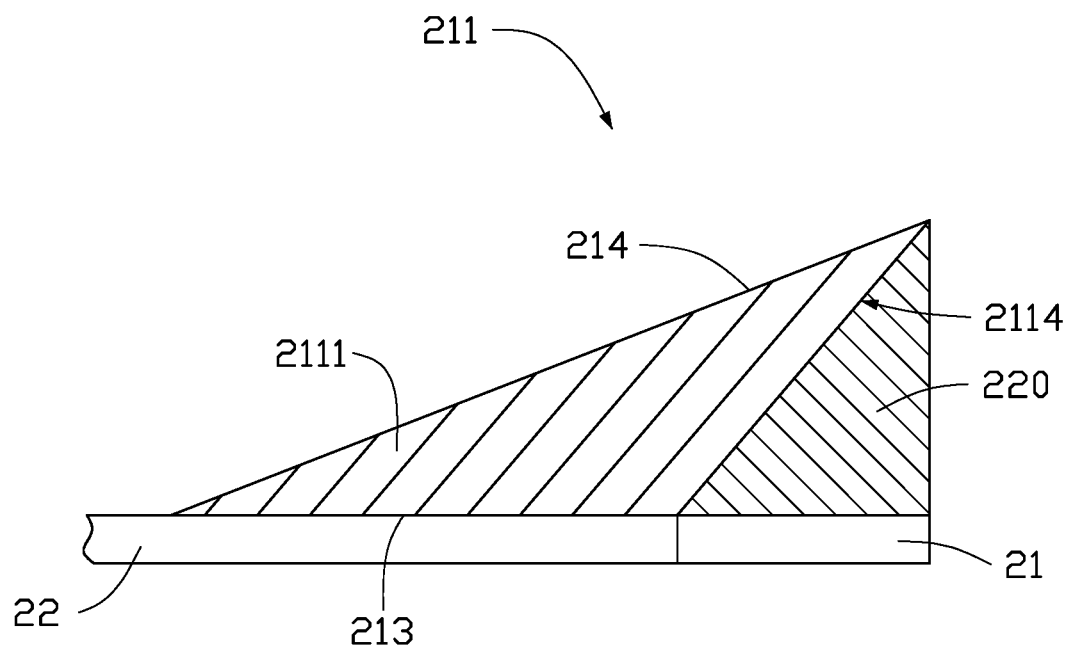
FIG. 7 is a cross-sectional view taken along line VII-VII in FIG. 6.

Referring to FIGS. 6 and 7, two adjacent side image compensating apparatuses 211 are connected via one of the corner image compensating apparatuses 212. Referring to FIG. 6, four side image compensating apparatuses 211 and four corner image compensating apparatuses 212 are alternately connected end to end to form a rectangular closed frame. The four corner image compensating apparatuses 212 are located on four corners of the display region 21.

Referring to FIG. 7, the side image compensating apparatus 211 includes a number of light guiding channels 2111 arranged as a matrix. In this exemplary embodiment, each of the light guiding channels 2111 is a light guiding fiber with the same diameter. The light guiding channels 2111 extend from the light incident surface 213 to the light emitting surface 214. The light guiding channels 2111 are parallel to the inclined surface 2114. A light from the display region 21 enters the image compensating apparatus 211 from the light incident surface 213 and is emitted out of the image compensating apparatus 211 by passing through the light guiding channels 2111. Thus, the viewer can see the image on the light emitting surface 214.

Figure 8:
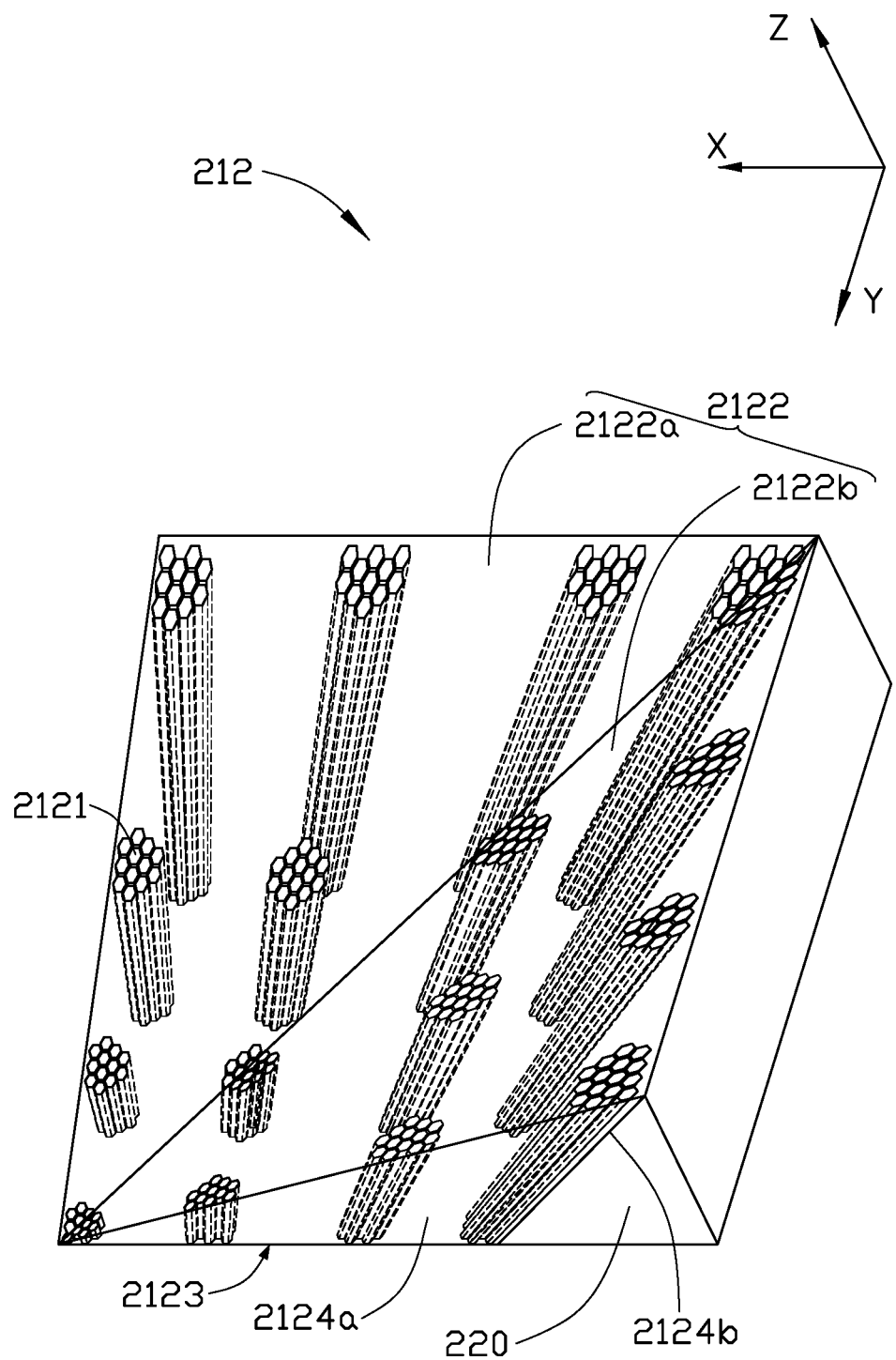
FIG. 8 is an isometric view of a corner image compensating apparatus of the display in FIG. 5.
Figure 9:
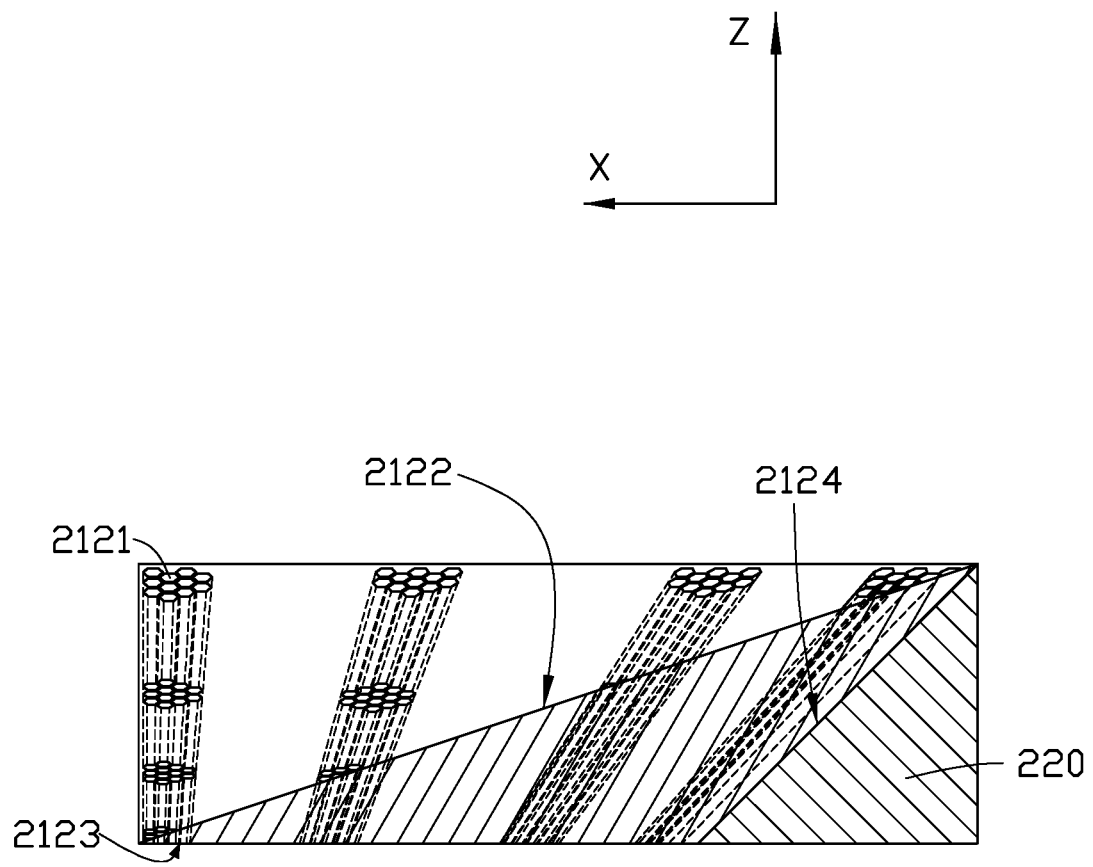
FIG. 9 is a front view of the corner image compensating apparatus in FIG. 8.

Referring to FIGS. 8 and 9, each of the corner image compensating apparatuses 212 includes a light output surface 2122, a light input surface 2123, and a slanted surface 2124. The light input surface 2122 includes a pair of interconnecting sub-output surfaces 2122a and 2122b. Preferably, the sub-output surface 2122a is not coplanar with the other sub-output surface 2122b. In the exemplary embodiment, the pair of sub-output surfaces 2122a and 2122b forms an angle, and the angle is obtuse. In this exemplary embodiment, the light input surface 2123 is a bottom surface of the image compensating apparatus 210 and is in contact with the display region 21. The slanted surface 2124 includes a pair of interconnecting sub-surfaces 2124a and 2124b. The slanted surface 2124 connects to the light output surface 2122 and the light input surface 2123. The sub-output surfaces 2122a and 2122b are inclined with respect to the light input surface 2123. The sub-surfaces 2124a and 2124b form an obtuse angle with the light input surface 2123. Preferably, the obtuse angle is preferably 135 degrees.

Figure 10:
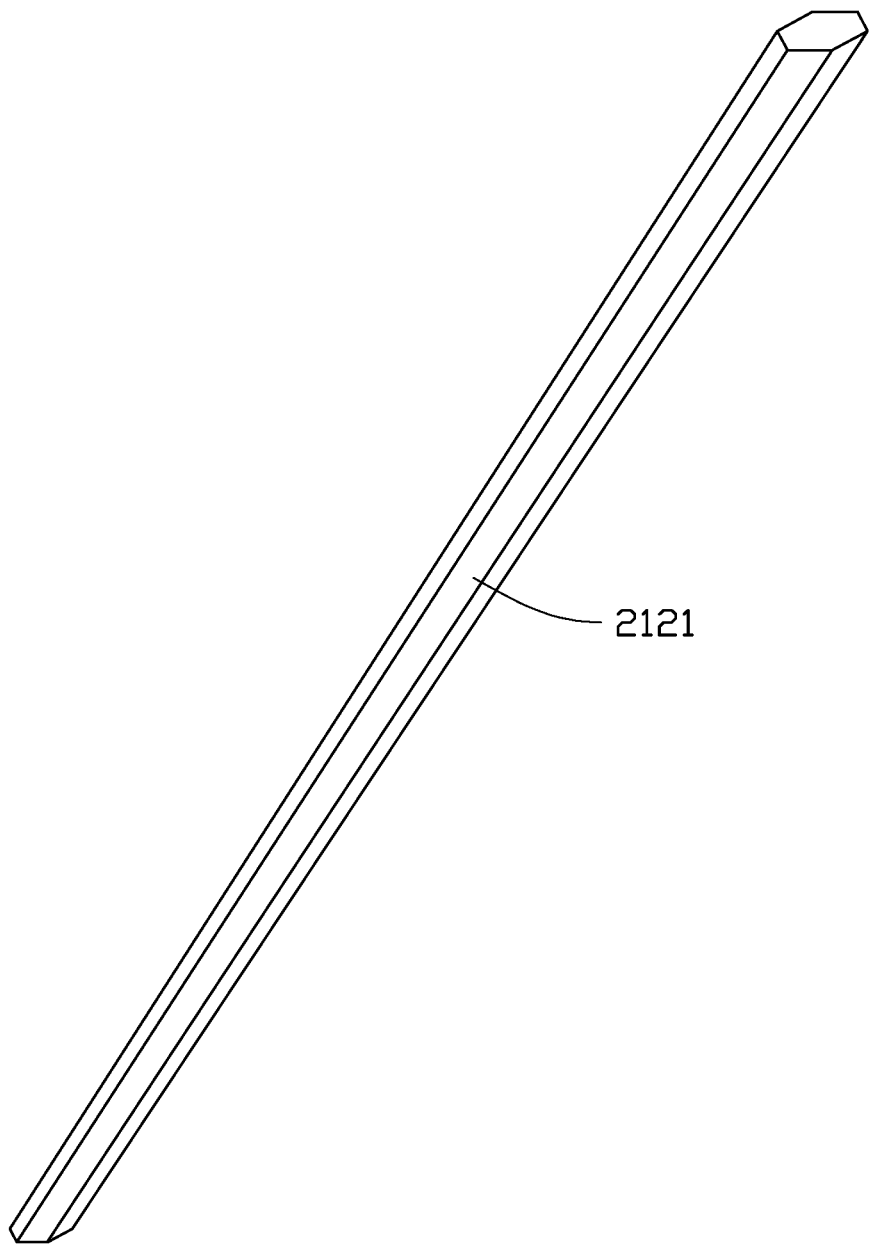
FIG. 10 is an isometric view of a light guiding fiber of the apparatus in FIG. 8.

Each of the corner image compensating apparatus comprises a number of light guiding channels 2121. Each of the light guiding channels 2121 is combined with a number of alveolated light guiding fibers. The light guiding fibers extends from the light input surface 2123 to the sub-output surfaces 2122a and 2122b. A diameter of the light guiding fibers of the corner image compensating apparatus 211 gradually increases over the length of the fiber. Referring to a coordinate system of FIG. 8, when the light guiding fiber extends along a Z axis, diameters of the light guiding fiber in X axis and Y axis are gradually increased. The light guiding fibers can be made of light guiding thin plates, silica fibers, glass fibers, or the other light-passing material. Also referring to FIG. 10, a cross-sectional area of the light guiding fiber gradually increases in the extending direction, or the lengthwise direction in the exemplary embodiment.

Since the projected area of the light output surface 2122 on the display panel 20 is greater than the area of the light input surface 2123, an image of the display region 21 covered by the light input surface 2123 is transmitted to the light output surface 2122 that is laid over the non-display region 22. Thus, the non-display region 22 is hidden from a viewer and the display 200 has a frame-less effect.

Figure 11:
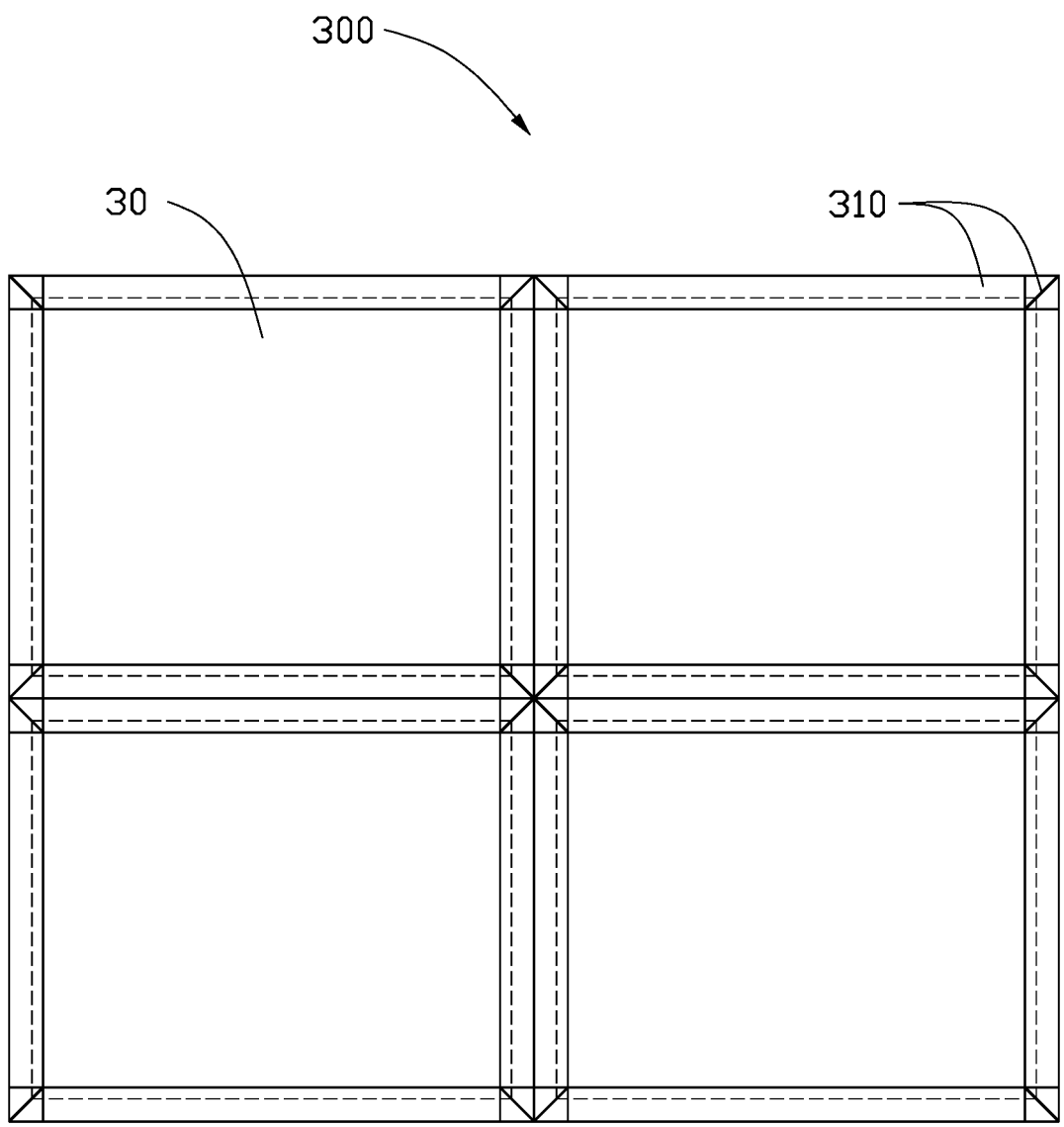
FIG. 11 is a schematic view of a first exemplary embodiment showing jointing of a display.

Referring to FIG. 11, the image compensating apparatus 310 can be used in a joint display 300 setting. The image compensating apparatuses 310 arranged in a matrix structure, in which a number of connecting seams between adjacent display panels 30 are set between the image compensating apparatuses 310. A frame-less effect of the display 300 is realized by the image transmitting function of the image compensating apparatuses 310. The display 300 can be, but is not limited to, a liquid crystal display panel and a plasma display panel. The shape of the image compensating apparatus 310 can be changed according to the shape of the display 300. The light input surface 2123 can be parallel to the light output surface 2122. For example, a cross-sectional of the image compensating apparatus 310 is an isosceles trapezoid. The light output surface 2122 is a top surface of the isosceles trapezoid and the light input surface 2123 is a bottom surface of the isosceles trapezoid. In other exemplary embodiments, the support portion is omitted. The image compensating apparatus 310 is fastened to the display panel 30 through adhesives or other fastening means.

Figure 12:
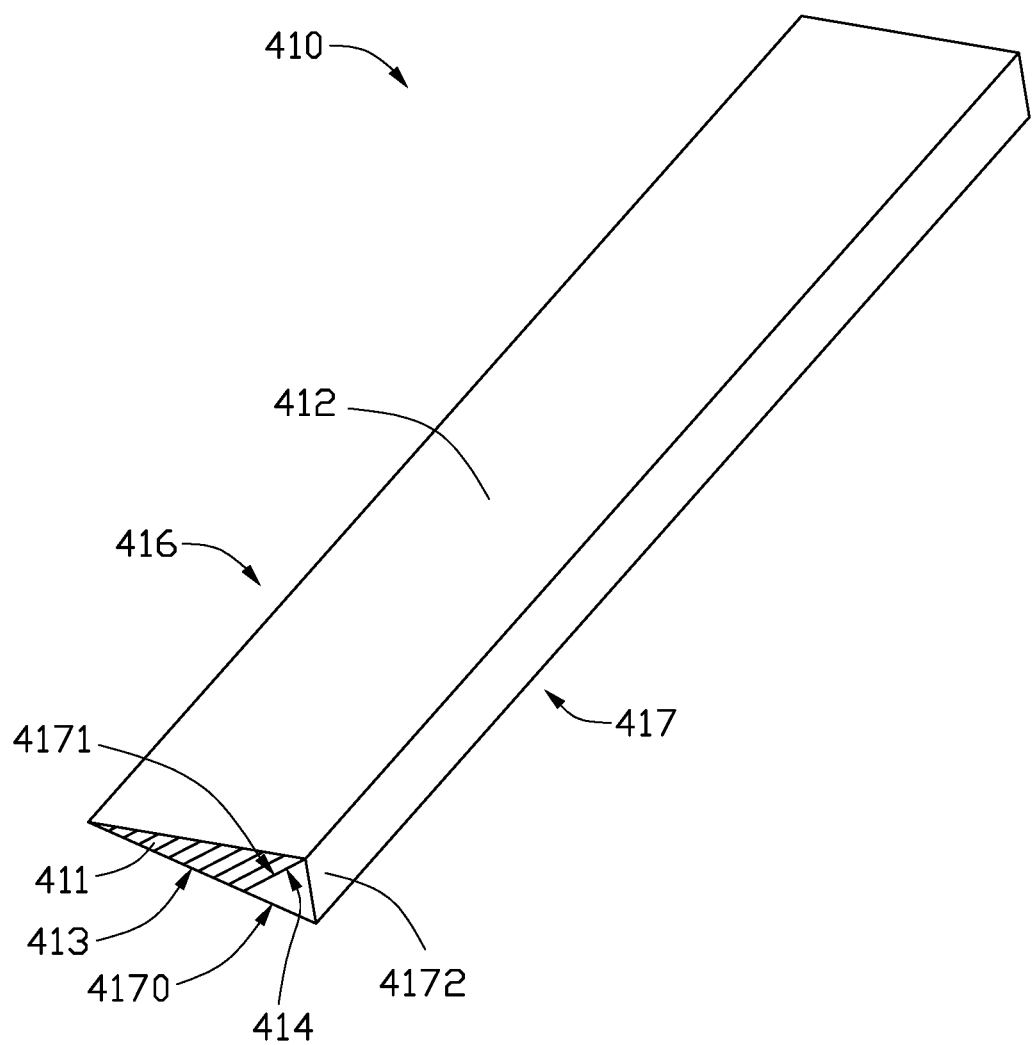
FIG. 12 is an isometric view of a first exemplary embodiment of an image compensating apparatus, the image compensating apparatus includes a plurality of light guiding fibers.

FIG. 12 shows a first exemplary embodiment of an image compensating apparatus 410. The image compensating apparatus 410 is similar to the image compensating apparatus 110 of FIGS. 2 and 4, and similar to the compensating apparatus 211 of FIGS. 5 and 7. The above-described features of image compensating apparatuses 110, 211 can apply to the image compensating apparatus 410.

The compensating apparatus 410 defines a light incident surface 413, a light emitting surface 412 connected to an edge of the light incident surface 413, and a plurality of light guiding channels 411 extending from the light incident surface 413 to the light emitting surface 412. A projected area of the light emitting surface 413 on the light incident surface 412 is greater than a projected area of the light incident surface 412 such that a light beam introduced into the light incident surface 412 is transmitted and extended to the light emitting surface 413. Extending directions of the plurality of light guiding channels 411 are substantially parallel to each other, and the plurality of light guiding channels 411 are arranged side by side. In the exemplary embodiment, the light guiding channels 411 are defined by light guiding fibers 415. Each light guiding channel 411 is independent from others in terms of light carried, without mutual interference.

Figure 13:
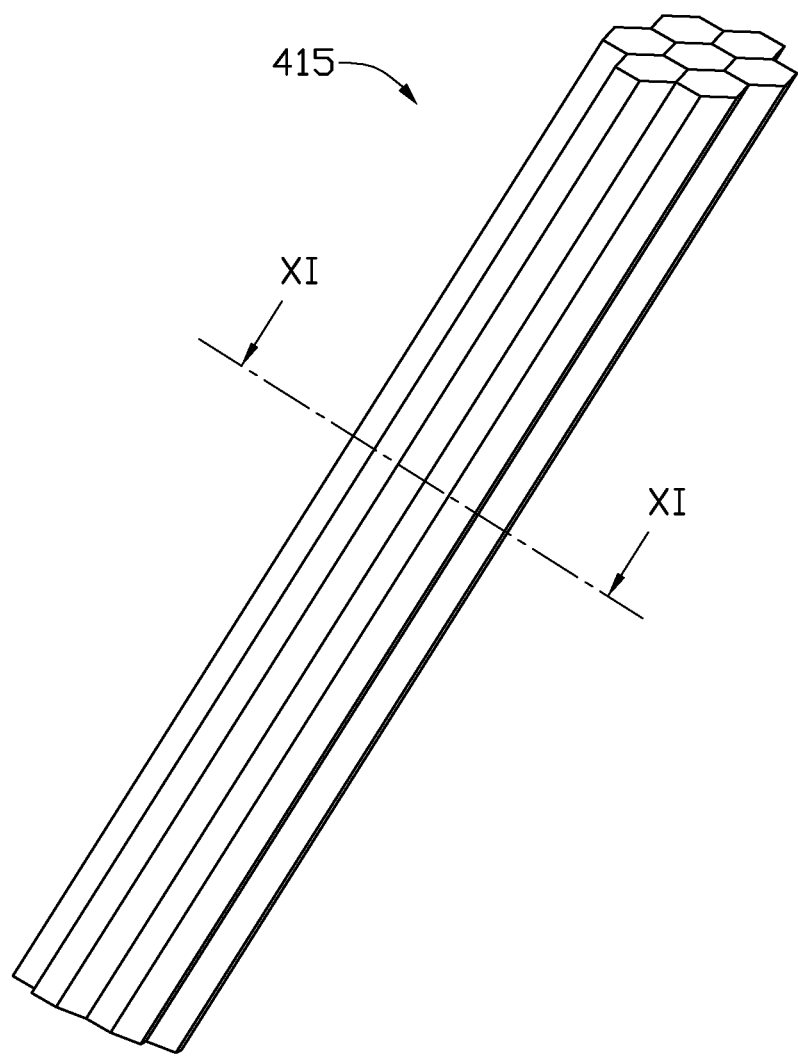
FIG. 13 is an enlarged isometric view of the closely arranged light guiding fibers of the image compensating apparatus in FIG. 12.

Extending directions of the light guiding fibers 415 are substantially parallel to each other, and the light guiding fibers 415 are arranged as a tight bundle as shown in FIG. 13. The tightly arranged light guiding fibers 415 are the light guiding fibers in the image compensating apparatus 410 of FIG. 12. A cross-sectional area of each light guiding fiber 410 is substantially in a hexagon shape. Side surfaces of each light guiding fiber 415 are in contact with side surfaces of other light guiding fibers 415 that are arranged around the light guiding fiber 415, thereby forming a light guiding element. The light guiding element includes a plurality of light guiding fiber 415 that is arranged in a bundle. When the light guiding channels of the image compensating apparatus 110 of FIG. 2 are defined by light guiding fibers 415, the detail structure of light guiding fibers 415 is same as shown in FIG. 13.

Figure 14:
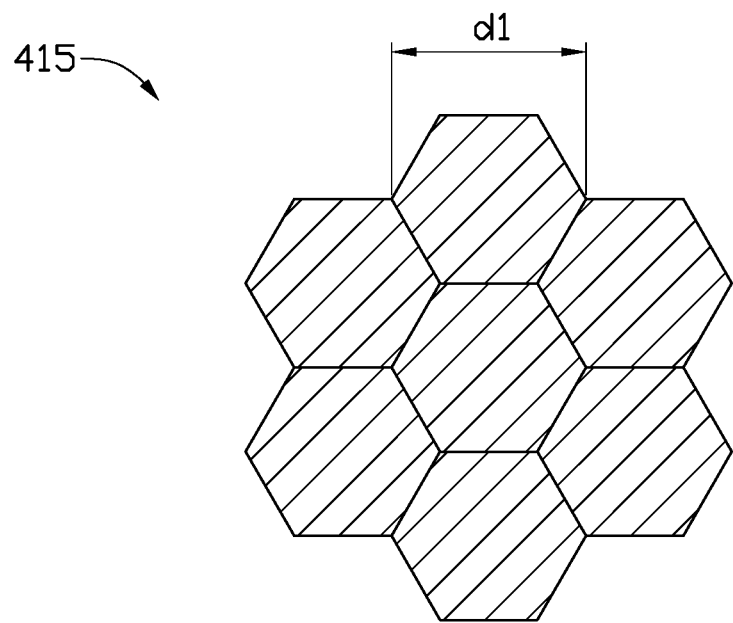
FIG. 14 is a cross-sectional view of the light guiding fibers in FIG. 13, taken along line XI-XI.

FIG. 14 shows a cross-sectional view of the light guiding fibers 415 of FIG. 13 along a direction perpendicular to extending directions of the light guiding fibers 415. A cross-sectional area of each light guiding fiber 415 is hexagonal, a diameter d1 is defined between opposite vertices of the cross-sectional area of each light guiding fiber 415. The two opposite vertices are vertices on the hexagonal cross-sectional area having the largest distance therebetween. The diameter d1 of each light guiding fiber 415 gradually increases from the light incident surface 413 toward the light emitting surface 412. The diameter d1 of each light guiding fiber 415 may be changed according to requirements. In one exemplary embodiment, the maximal diameters d1 of the light guiding fiber 415 is about 5 um.

Referring to FIG. 12 again, in the exemplary embodiment, the light incident surface 413 and the light emitting surface 412 are planar surfaces that intersect with each other. The image compensating apparatus 410 further defines an inclined surface 414 interconnecting the light incident surface 413 and the light emitting surface 412. The inclined surface 414 is inclined with respect to the light incident surface 413. The inclined surface 414 and the light incident surface 413 may define an obtuse angle, such as 135 degrees. The light incident surface 413 and the light emitting surface 412 may define an acute angle, such as 18.4 degrees. In the exemplary embodiment, the image compensating apparatus 410 is a triangular prism that is bounded by the light incident surface 413, the light emitting surface 412, and the inclined surface 414.

The compensating portion 416 of the image compensating apparatus 410 may be defined by the plurality of light guiding channels 411. The image compensating apparatus 410 may include a detachable support portion 417 in contact with the inclined surface 414. The support portion 417 is used to support the compensating portion 416 and the image compensating apparatus 410. The support portion 417 has a height equal to a height of the compensating portion 416, and a bottom of the support portion 417 is coplanar to the light incident surface 413. The support portion 417 is substantially a triangular prism, and defines a supporting surface 4171, a bottom surface 4170, and a connecting surface 4172. The supporting surface 4171 abuts the inclined surface 414. The bottom surface 4170 is coplanar to the light incident surface 413. The connecting surface 4172 interconnects to the supporting surface 4171 and the bottom surface 4170. In one exemplary embodiment, a cross-sectional area of the support portion 417 is an isosceles right triangle. The bottom surface 4170 is perpendicular to the connecting surface 4172. The support portion 417 may be made of glass. In one exemplary embodiment, the image compensating apparatus 410 does not include the support portion 417, apparatus 410 merely comprises the compensating portion 426 with the plurality of light guiding channel 411.

Figure 15:
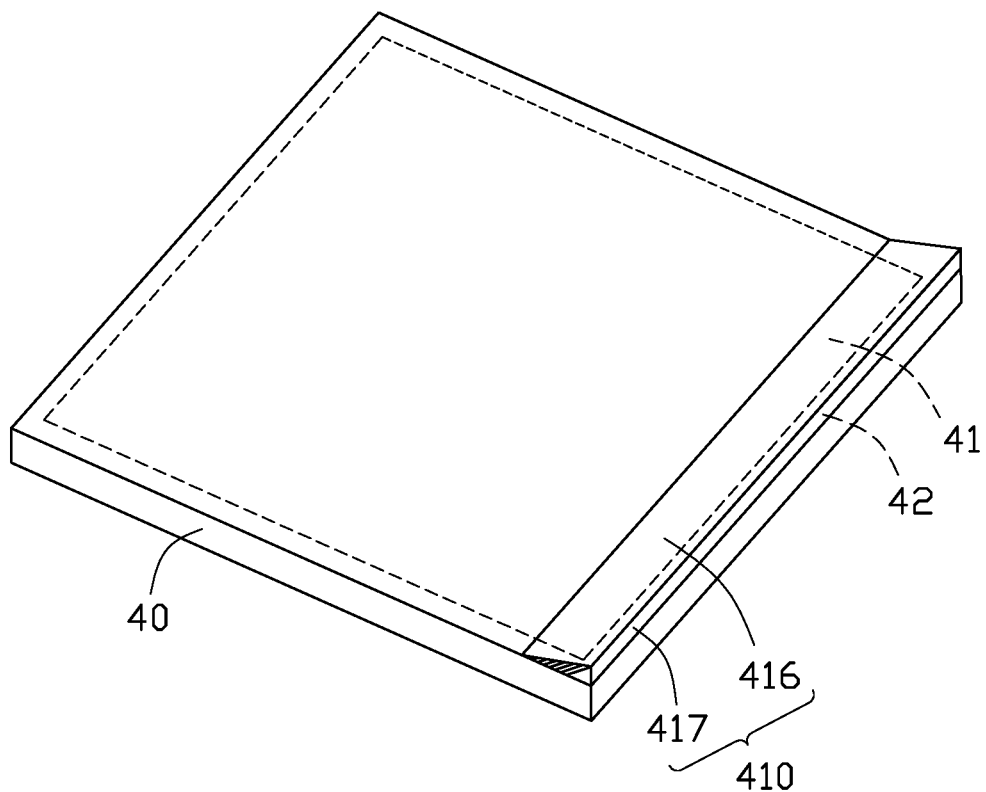
FIG. 15 is an isometric view of the image compensating apparatus of FIG. 12 upon a display panel.
Figure 16:
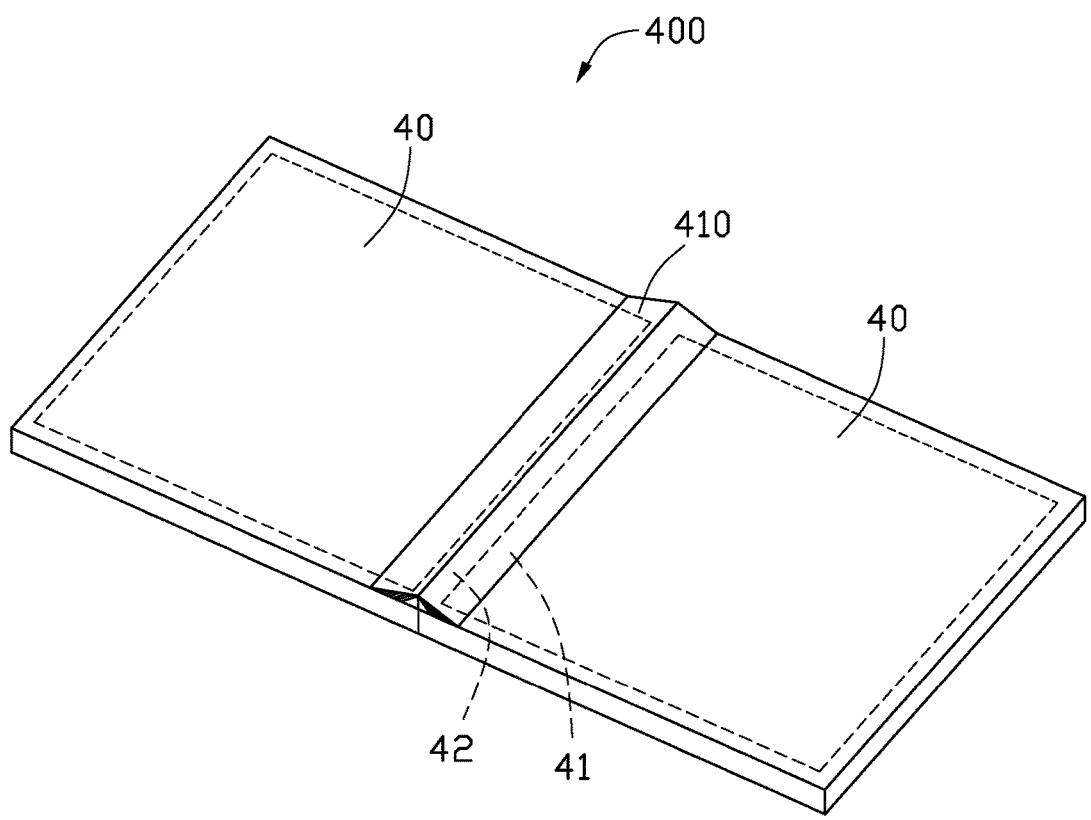
FIG. 16 shows an assembly, capable of displaying, jointed from a plurality of display panels as in FIG. 15.

FIG. 15 shows the image compensating apparatus 410 disposed upon a display panel 40. The compensating portion 416 of the image compensating apparatus 410 is disposed on a periphery of the display region 41 of the display panel 40 and is aligned to an edge of the non-display region 42. The compensating portion 416 introduces images from the peripheral display region 41 and displays the image on the non-display region 42, thereby the image is laid over the non-display region 42. The support portion 417 may be disposed upon the non-display region 42 and support the compensating portion 416. The width of the compensating portion 416 and the support portion 417 may be adjusted according to requirements. In one exemplary embodiment, the respective widths of the compensating portion 416 and the light incident surface 413 are about 10 millimeters. The area of the inclined surface 414 is equal to the area of the supporting surface 4171. The respective widths of the bottom surface 4170 and the connecting surface 4172 may both be 5 millimeters. Preferably, the image compensating apparatus 410 may be disposed on the display panel 40 having non-display regions 42 (border region) with width of 5 millimeters. Light beams introduced from the peripheral display region 41 are transmitted and extended to the compensating portion 416 so as to completely cover the non-display regions 42, thereby displaying image on the display panel 40 without any lattice edge. FIG. 16 shows a display assembly 400 of two joined display panels 40, the image compensating apparatus 410 of the two display panels 40 are disposed on a jointing portion of the two display panels 40. The image introduced from the peripheral display region 41 is displayed on the image compensating apparatus 410 and covers the non-display regions 42 (border region) to accomplish a seamless display without any black-edge or interruption between the two display panels 40. The display quality of the display assembly 400 is greatly enhanced. The image compensating apparatus 410 used in the display panel 40 enables a plurality of display panel 40 to be assembled together in one plane without reducing display quality.

Figure 17:
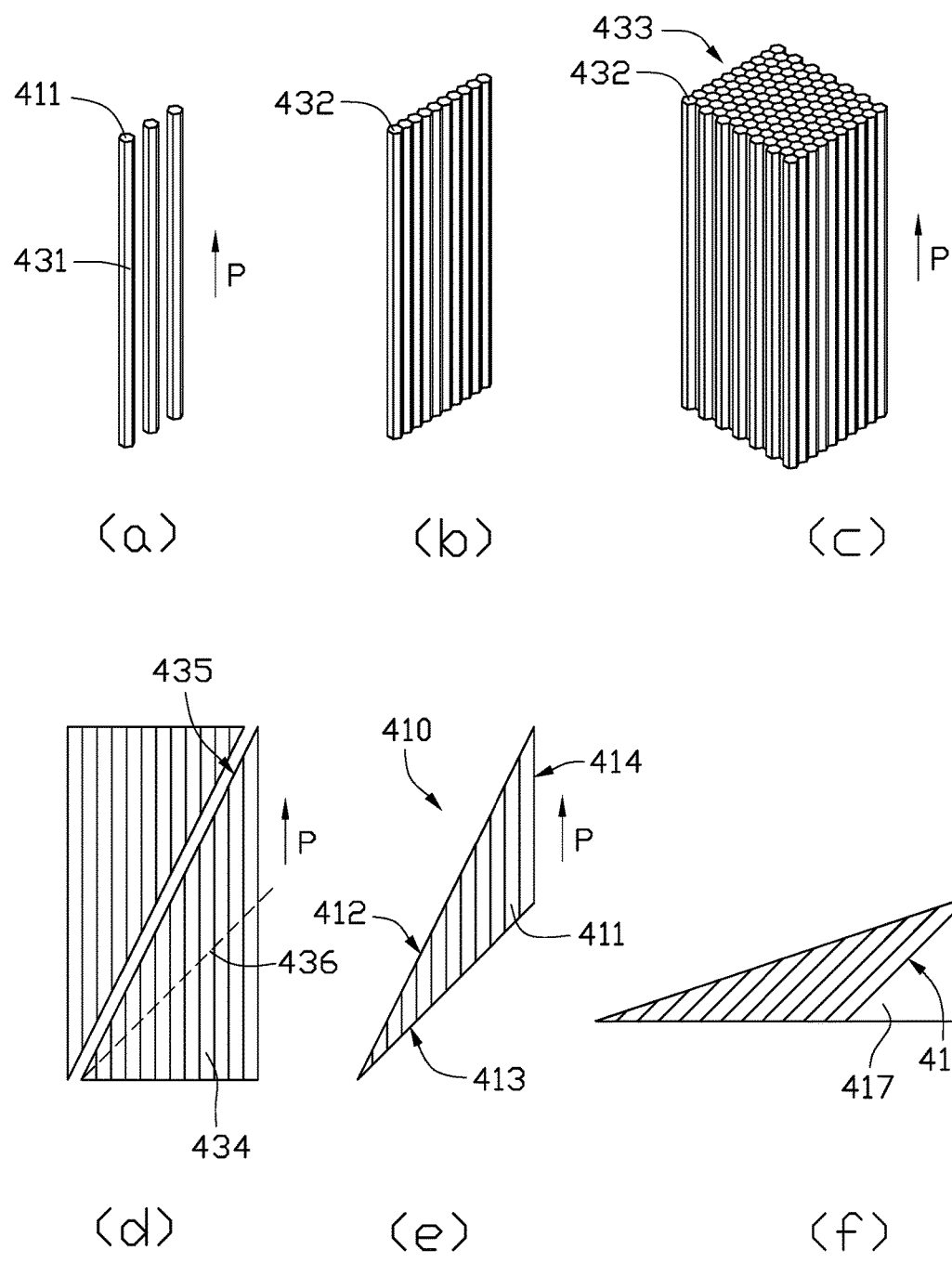
FIG. 17 is a schematic diagram of steps of a first exemplary embodiment of a manufacturing method for manufacturing the image compensating apparatus in FIG. 12.
Figure 18:
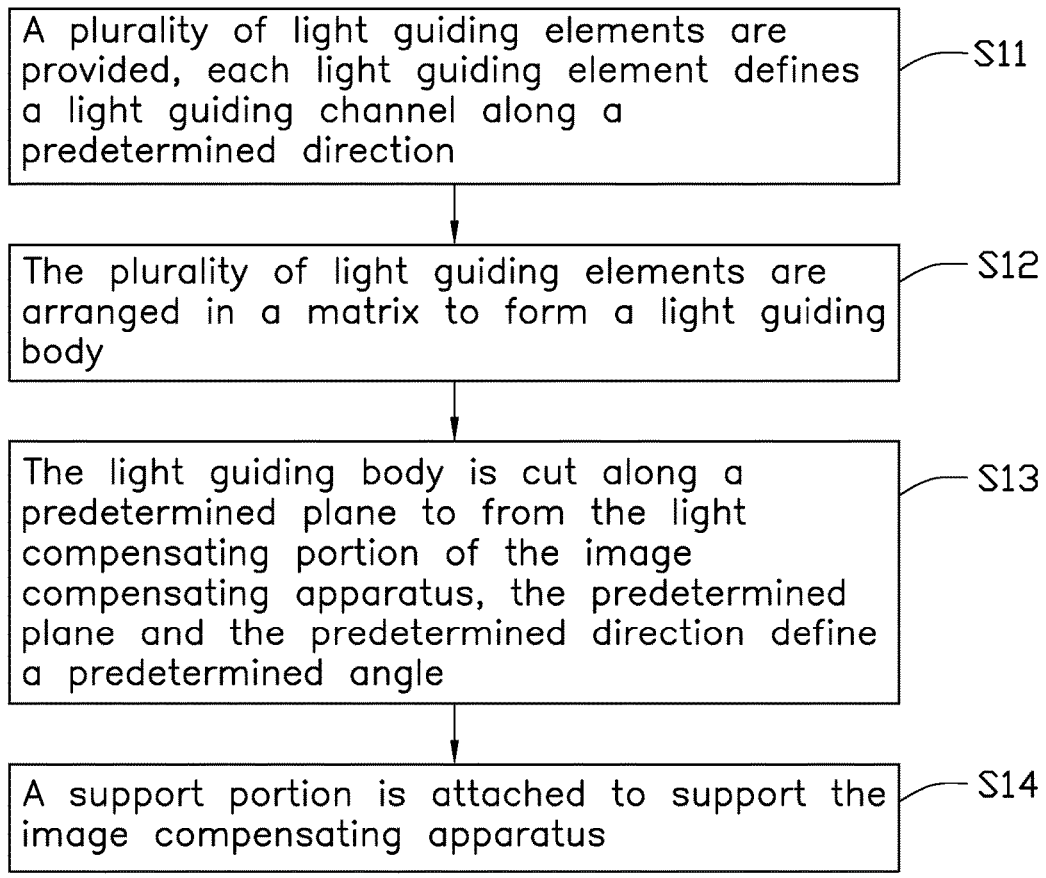
FIG. 18 is a flow chart of the manufacturing method in FIG. 17.

FIG. 17 shows steps of a first exemplary embodiment of a manufacturing method for manufacturing the image compensating apparatus 410. FIG. 18 is a flow chart of the manufacturing method of FIG. 17.

The steps of the manufacturing method of the image compensating apparatus 410 include steps S11-S14. FIGS. 17(a), 17(b), 17(c) are isometric views, and FIGS. 17(d), 17(e), 17(f) are side views.

Referring to FIG. 17(a) and step S11 in FIG. 18, a plurality of light guiding elements 431 are provided, each light guiding element 431 defines a light guiding channel 411 along a predetermined direction P. The light guiding elements 431 are defined by light guiding fibers, such as optical fibers. Cross-sectional area of each light guiding channel 411 remains constant.

Referring to FIG. 17(b)-(c) and step S12 in FIG. 18, the plurality of light guiding elements 431 are arranged in a matrix to form a light guiding body 433. The plurality of light guiding elements 431 are divided into a number of groups, each group is arranged in single layer, two layers, or a plurality of layer types, to form a plurality of light guiding films 432. The plurality of light guiding films 432 are laminated or adhered together at high temperature to form the light guiding body 433. In the exemplary embodiment, the light guiding body 433 is substantially cuboid. The predetermined direction P is perpendicular to a top surface and a bottom surface of the cuboid, same as the light guiding body 433.

Referring to FIG. 17(d)-(e), and step S13 in FIG. 18, the light guiding body 433 is cut along a predetermined plane to from the light compensating portion 416 of the image compensating apparatus 410, the predetermined plane and the predetermined direction P define a predetermined angle. The compensating apparatus 410 defines a light incident surface 413, a light emitting surface 412 connected to an edge of the light incident surface 413, and an inclined surface 414 connected to the light incident surface 413 and the light emitting surface 412. The light guiding channel 411 extends from the light incident surface 413 to the light emitting surface 412. A projected area of the light emitting surface 413 on the light incident surface 412 is greater than a projected area of the light incident surface 412.

The step S13 may include: the light guiding body 433 cut along a first cutting plane 435 that is defined by diagonal lines of a pair of symmetrical side surfaces of the light guiding body 433, thereby obtaining a tri-prism light guiding element 434. The tri-prism light guiding element 434 is cut along a second cutting plane 436 connecting with the first cutting plane 435, thereby obtaining the compensating portion 416 of the image compensating apparatus 410. The second cutting plane 436 and the first cutting plane 435 define an angle. When the image compensating apparatus 410 does not include the supporting portion 417, and when the step S13 is completed, the manufacturing method of the image compensating apparatus 410 is accomplished.

Referring to FIG. 17(f), and step S14 in FIG. 18, a support portion 417 is attached to support the image compensating apparatus 410. The support portion 417 is combined to the inclined surface 414 by adhesion or lamination at high temperature. The support portion 417 may be made of glass.

Figure 19:
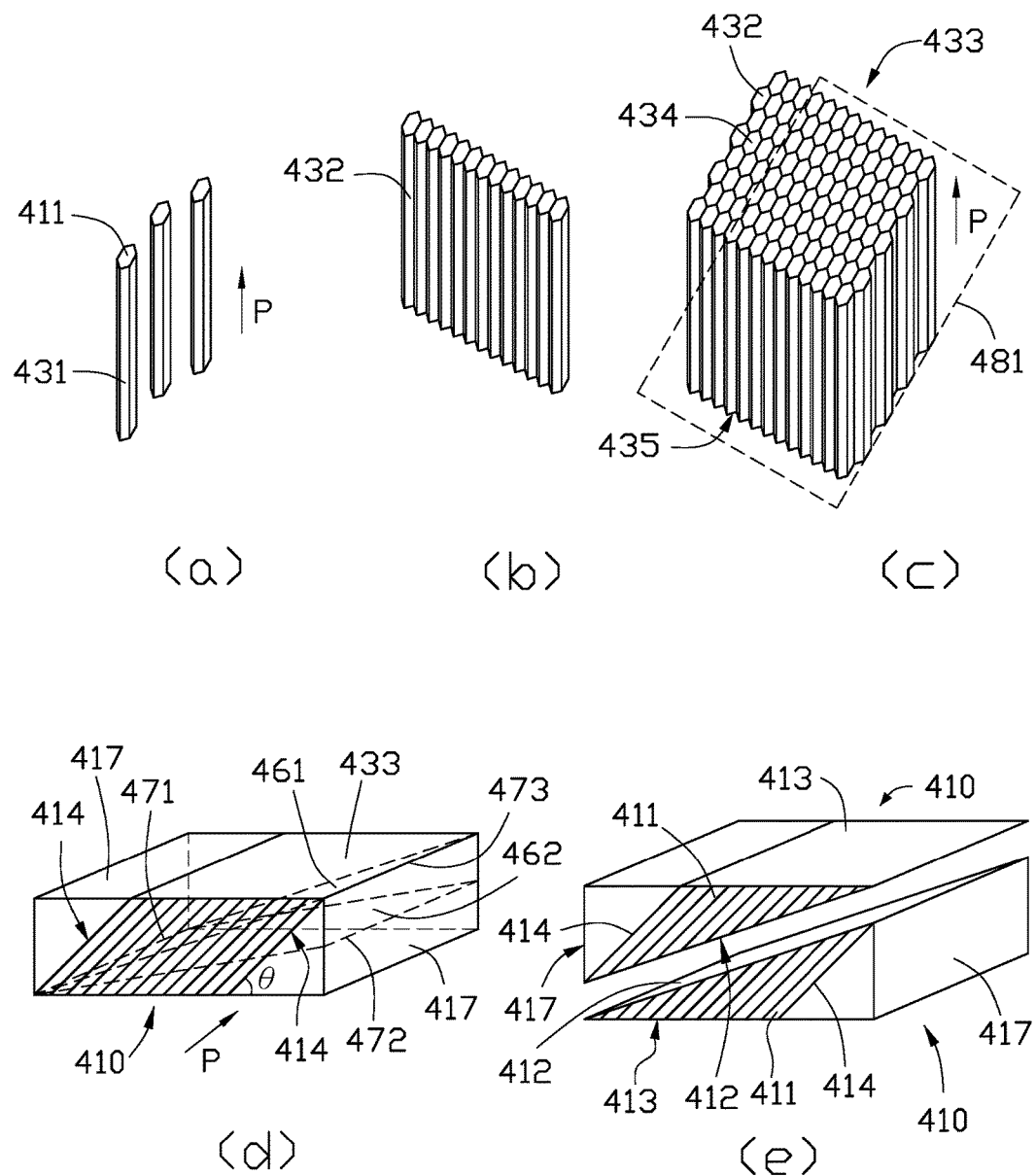
FIG. 19 is a schematic diagram of steps of a second exemplary embodiment of a manufacturing method for manufacturing the image compensating apparatus in FIG. 12.
Figure 20:
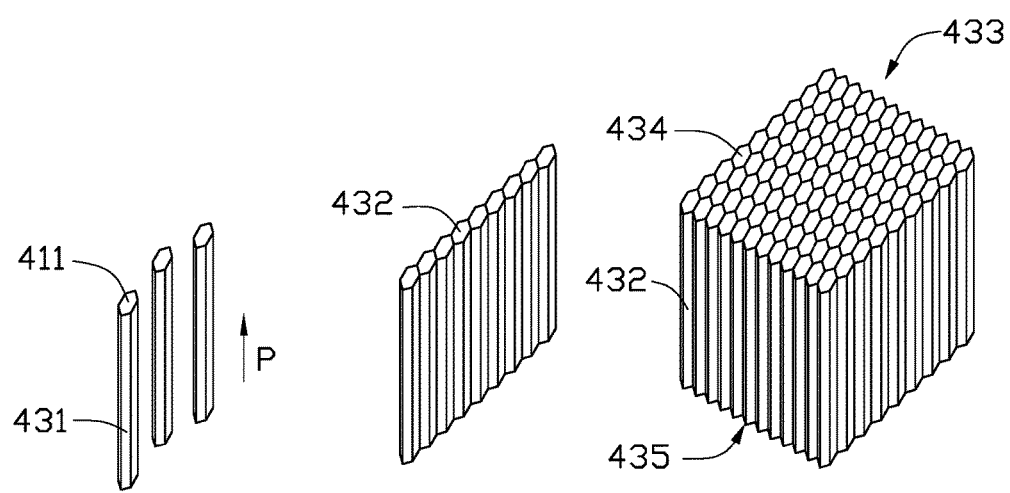
FIG. 20 is a schematic diagram of steps of method of a third exemplary embodiment of a manufacturing process of the image compensating apparatus in FIG. 12.
Figure 20:
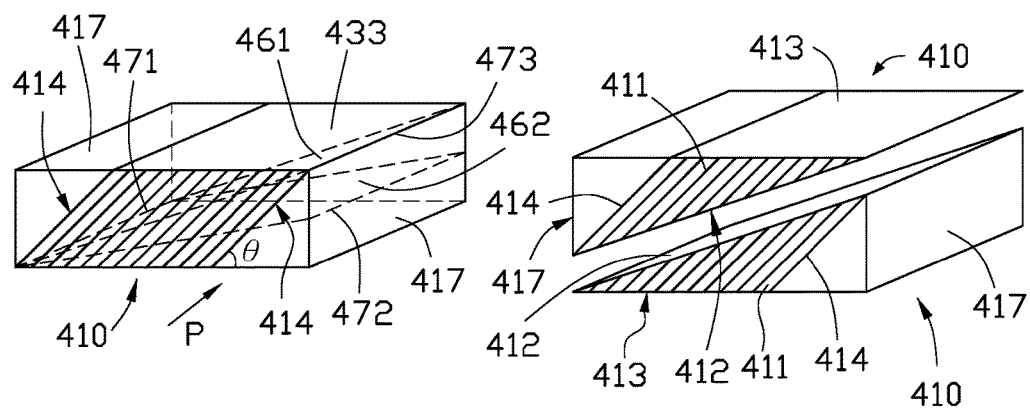
Figure 21:
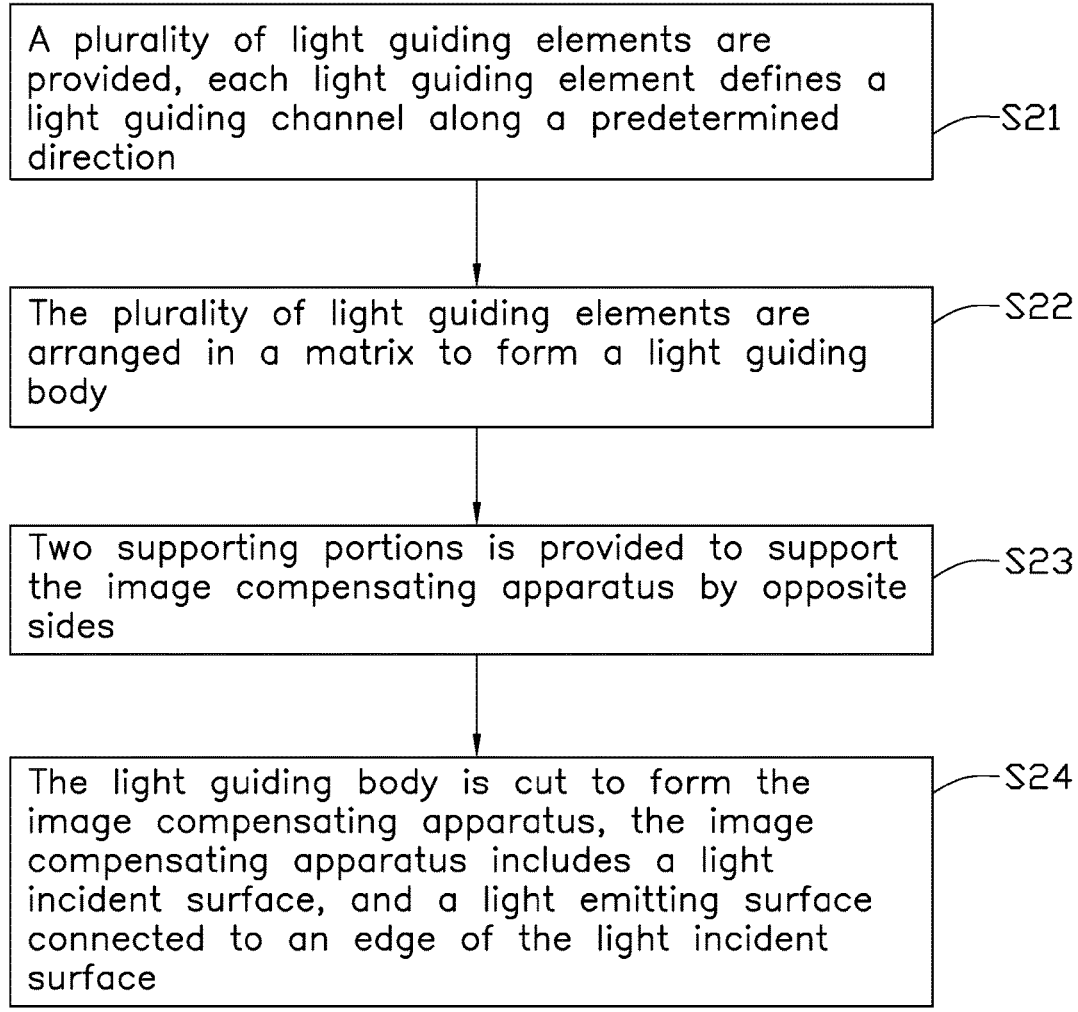
FIG. 21 is a flow chart of the manufacturing method in FIG. 19

Referring to FIGS. 19 through 21, FIG. 19 is a schematic diagram of steps of a second exemplary embodiment of the manufacturing method for manufacturing the image compensating apparatus 410 of FIG. 12. FIG. 20 is a schematic diagram of steps of a second exemplary embodiment of the manufacturing method similar to FIG. 19. FIG. 21 is a flow chart of the manufacturing method of FIG. 19. The manufacturing method for manufacturing the image compensating apparatus 410 includes steps 21-24.

Referring to FIG. 19(a), and step 21 in FIG. 21, a plurality of light guiding elements 431 are provided, each light guiding element 431 defines a light guiding channel 411 along a predetermined direction P. The light guiding elements 431 are defined by light guiding fibers.

Referring to FIGS. 19(b)-(c) and 20 (b)-(c), and step S22 in FIG. 21, the plurality of light guiding elements 431 are arranged in a matrix to form a light guiding body 433. In step S22, the plurality of light guiding elements 431 are divided in a number of groups each arranged in single layer/two layers/a plurality of layer types, to form a plurality of light guiding films 432. The plurality of light guiding films 432 is laminated and adhered together at high temperature to form the light guiding body 433. In the exemplary embodiment shown in FIGS. 19(b)-(c), the light guiding film 432 is substantially rectangular. A bottom end of each light guiding film 432 is located on a plane 481, the next light guiding film 432 is located at a position higher than the light guiding film 432 in a vertical direction. The light guiding body 433 is substantially parallelepiped. The plane 481 and the predetermined direction P define an acute angle. In FIGS. 20(b)-(c), in the substituting exemplary embodiment, each light guiding film 432 is substantially a parallelogram, a bottom end of each light guiding film 432 is located on a plane 481, the next light guiding film 432 is arranged at a side of the light guiding film 432 with the bottom surfaces of the two light guiding films 432 arranged at a same vertical height. The top surface 434, the bottom surface 435, the front surface 414, and the rear surface 414 of the light guiding body 433 are substantially rectangular. The pair of side surfaces of the light guiding body 433 is parallel to each other, and the light guiding body 433 is substantially a parallelogram.

Also referring to FIGS. 19(d) and 20(d), and step 23 in FIG. 21, two supporting portions 417 are provided to support the image compensating apparatus 410. The surfaces 414 of two supporting portions 417 face the light guiding body 433. The two supporting portions 417 and the two corresponding light guiding bodies 433 are combined to form a cuboid. The two supporting portions 417 and the light guiding bodies 433 may be combined to by adhesion or lamination at high temperature. In the exemplary embodiment, the support portion 417 is made of glass.

Also referring to FIGS. 19(e) and 20(e), and step 24 in FIG. 21, the light guiding body 433 is cut to form two image compensating apparatuses 410. The image compensating apparatus 410 includes a light incident surface 413 and a light emitting surface 412 connected to an edge of the light incident surface 413. The light guiding channel 411 extends from the light incident surface 413 to the light emitting surface 412. A projected area of the light emitting surface 413 on the light incident surface 412 is greater than a projected area of the light incident surface 412. In the exemplary embodiment, the broken lines in FIG. 19(d) indicate lines of two planes (461, 462), the light guiding body 433 is cut along the two planes (461, 462), each of the two planes (461, 462) and the predetermined direction P define an angle. The plane 461 is defined by a bottom edge 471 and a top edge 473 of the light guiding body 433. The bottom edge 471 is located at a bottom side of the front surface 414 of light guiding body 433. The top edge 473 is parallel with the bottom edge 471, and further is opposite to the bottom edge 471. The top edge 473 is located at a top side of the rear surface 414 of light guiding body 433. The plane 462 is defined by the bottom edge 471, and a middle line 472 of a surface of the support portion 417. The middle line 472 is opposite to bottom edge 471, the surface of the support portion 417 is opposite to the rear surface 414. In a preferred exemplary embodiment, the plane 461 is defined by diagonal lines of a pair of symmetrical side surfaces of the light guiding body 433. In steps S13 and S24, the cut way may be determined by a requirement, such as cutting opposite ends of the image compensating apparatus 410 obtained in steps S13 or S24 to form an image compensating apparatus 410 of FIGS. 1 and 2. The angle defined by the plane 461 and the predetermined direction P may be adjusted according to an area of the non display region.

Figure 22:
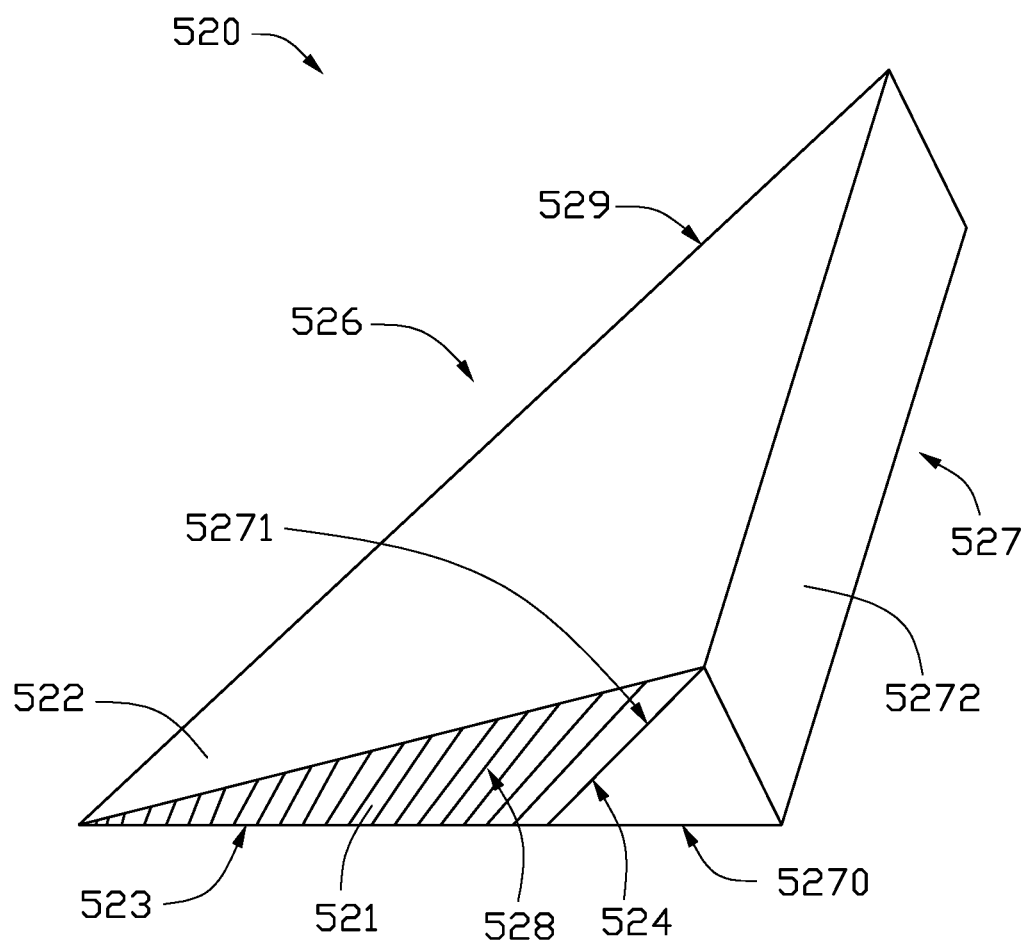
FIG. 22 is an isometric view of a second exemplary embodiment of an image compensating apparatus, the image compensating apparatus includes a plurality of light guiding fibers.

FIG. 22 show an isometric view of an image compensating apparatus 520 manufactured by the second exemplary embodiment of the manufacturing method. The image compensating apparatus 520 is similar to the periphery image compensating apparatus 212 of FIGS. 5, and 8-10, therefore, all of above descried referring to periphery image compensating apparatus 212 may be suited to the image compensating apparatus 520.

The image compensating apparatus 520 defines a light incident surface 523, a light emitting surface 522 connected to an edge of the light incident surface 523, and a plurality of light guiding channels 521. A projected area of the light emitting surface 522 on the light incident surface 523 is greater than a projected area of the light incident surface 523. The plurality of light guiding channels 411 are separated from each other and extends from the light incident surface 523 to the light emitting surface 522. An area of cross-sectional area of each light guiding channel 521 increases gradually from the light incident surface 523 to the light emitting surface 522, thus a light beam introduced into the light incident surface 523 is transmitted and expanded to the light emitting surface 522 via the light guiding channel 521. Extending directions of the plurality of light guiding channels 521 are substantially parallel to each other, and the plurality of light guiding channels 521 are arranged in a bundle. In the exemplary embodiment, the light guiding channels 521 are defined by light guiding fibers 525. Because the extending direction of each light guiding fiber 525 is independent from each other, the guiding directions of the plurality of guiding channels 521 are independent from each other without interference.

Figure 23:
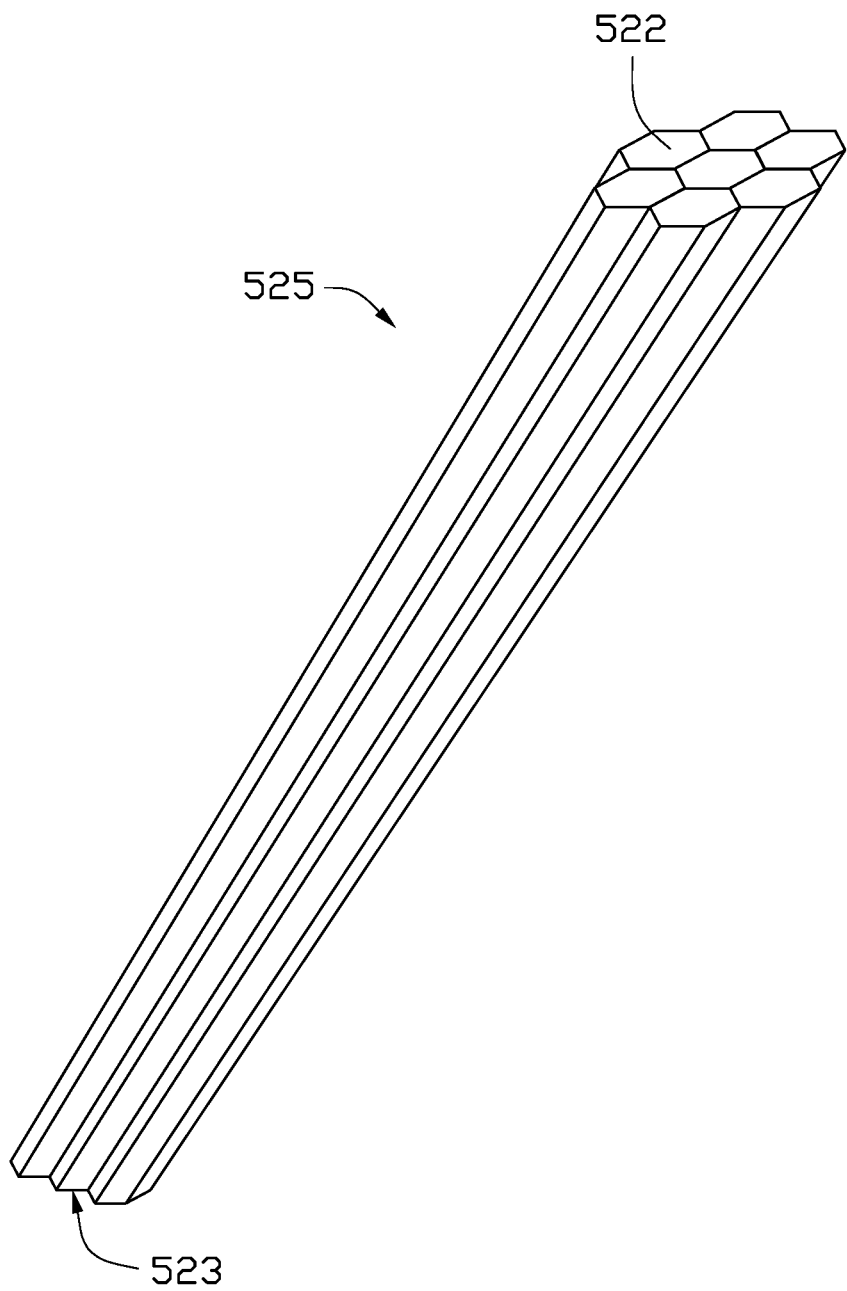
FIG. 23 is an enlarged isometric view of the closely arranged light guiding fibers of the image compensating apparatus in FIG. 22.

The light guiding fibers 525 of the image compensating apparatus 520 has guiding directions parallel to each other, and are tightly arranged in bundle. FIG. 23 shows an enlarged, isometric view of tightly arranged light guiding fibers 525 of the image compensating apparatus 520 of FIG. 22. A cross-sectional area of each light guiding fiber 525 is substantially in a hexagon shape. Side surfaces of each light guiding fiber 525 are combined to side surfaces of the light guiding fibers 525 arranged around the light guiding fiber 525, thereby forming a light guiding element including a plurality of light guiding fibers 525 arranged in bundle. When the light guiding channels 521 of the image compensating apparatus 520 of FIGS. 5, and 8-9, are defined by light guiding fibers 525, the detail structure of light guiding fibers 525 is same as shown in FIG. 22. That is, in FIGS. 8 and 9, gaps between adjacent bundles of light guiding fibers 525 are packed with light guiding fibers 525, such that a complete light guiding fibers 525 matrix is formed. FIGS. 8 and 9 merely show structures of light guiding fibers 525 in different region.

Figure 24:
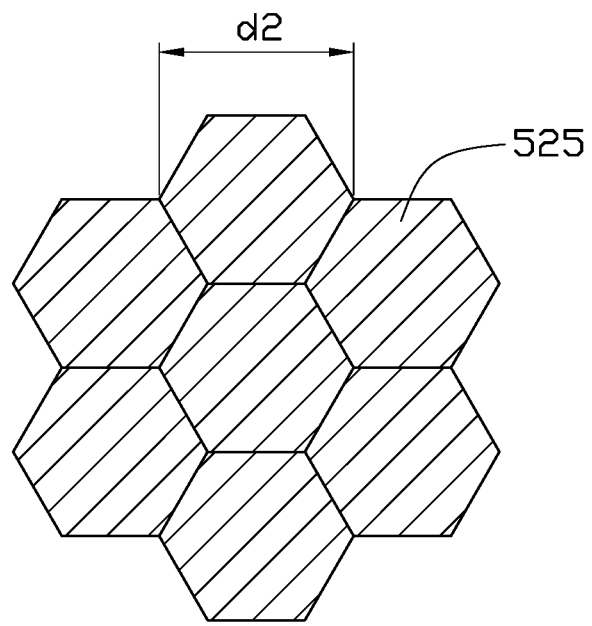
FIG. 24 is a cross-sectional view of the light guiding fibers in FIG. 22 along a direction perpendicular to the extending directions of the light guiding fibers.

FIG. 24 shows a cross-sectional view of the light guiding fibers 525 in FIG. 22 along a direction perpendicular to extending directions of the light guiding fibers 525. The cross-sectional area of each light guiding fiber 525 is hexagon, an outline diameter d2 is defined between opposite end points of the cross-sectional area. The outline diameter d2 of each light guiding fiber 525 increases from the light incident surface 523 toward light emitting surface 522 gradually. The diameter d2 of each light guiding fiber 525 may be changed according to a requirement. In one exemplary embodiment, the diameters d2 of the longest light guiding fiber 525 increases from 3.3 um to 5 um.

Referring to FIG. 22 again, in the exemplary embodiment, the light incident surface 523 and the light emitting surface 522 are planar surfaces, and intersects with each other. The image compensating apparatus 520 further defines an inclined surface 524 interconnecting the light incident surface 523 and the light emitting surface 522. The inclined surface 524 is inclined towards the light incident surface 523. The inclined surface 524 and the light incident surface 523 may define an obtuse angle, such as 135 degrees. The light incident surface 523 and the light emitting surface 522 define an acute angle, such as 18.4 degrees. The image compensating apparatus 520 is a pentahedron, and is bounded by the light incident surface 523, the light emitting surface 522, the inclined surface 524, a first end surface 528, and a second end surface 529. The inclined surface 524 is a parallelogram. The light incident surface 523, the light emitting surface 522, the first end surface 528, and the second end surface 529 are triangles. Four edges of the inclined surface 524 connects with the light incident surface 523, the light emitting surface 522, the first end surface 528 and the second end surface 529.

The compensating portion 526 of the image compensating apparatus 520 may be defined by the plurality of light guiding channels 521. The image compensating apparatus 520 may also include a support portion 527 combined to the inclined surface 524. The support portion 527 is used to support the compensating portion 526, and the image compensating apparatus 520. The support portion 527 has a height equal to a height of the compensating portion 526, a bottom of the support portion 527 is coplanar to the light incident surface 523. The support portion 527 is substantially triangular prism, and defines a supporting surface 5271, a bottom surface 5270, and a connecting surface 5272. The supporting surface 5271 is combined to the inclined surface 524. The bottom surface 5270 is coplanar to the light incident surface 523. The connecting surface 5272 interconnects the supporting surface 5271 and the bottom surface 5270. In one exemplary embodiment, a cross-sectional area of the support portion 527 is an isosceles right triangle. The bottom surface 5270 is perpendicular to the connecting surface 5272. The support portion 527 may be made of glass.

Figure 25:
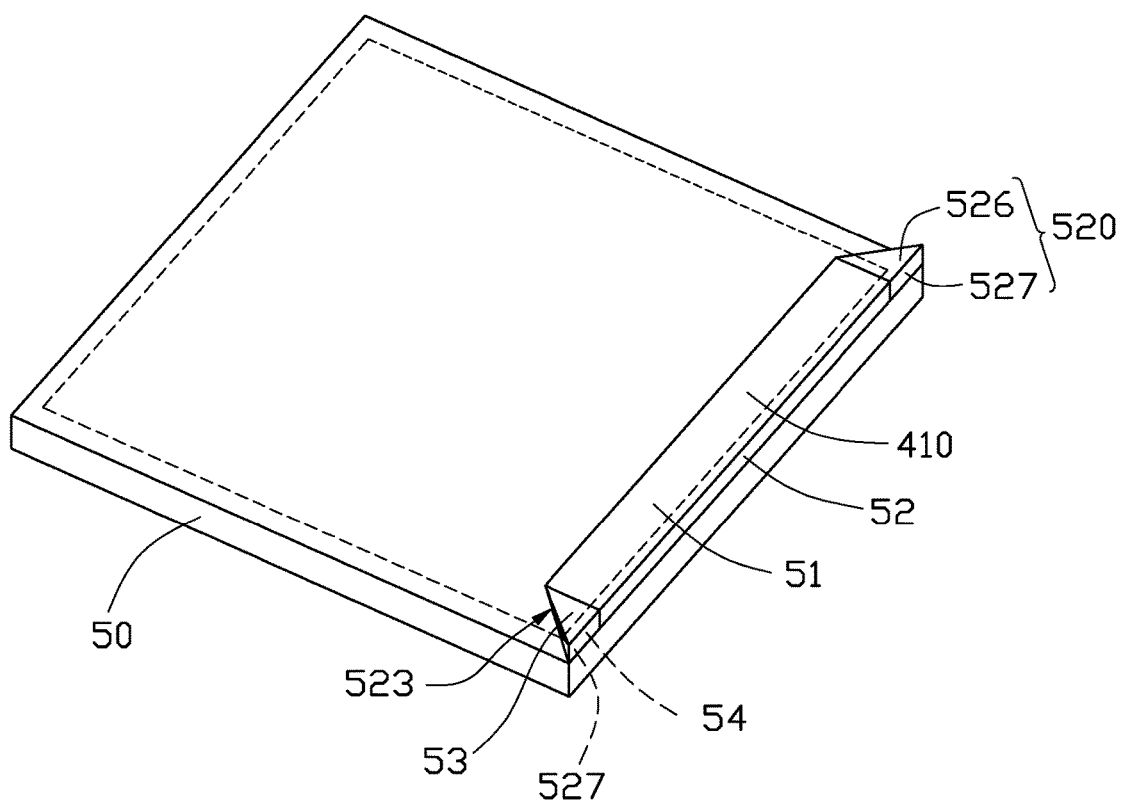
FIG. 25 is an isometric view of the image compensating apparatus of FIGS. 12 and 22 side by side on the display panel.
Figure 26:
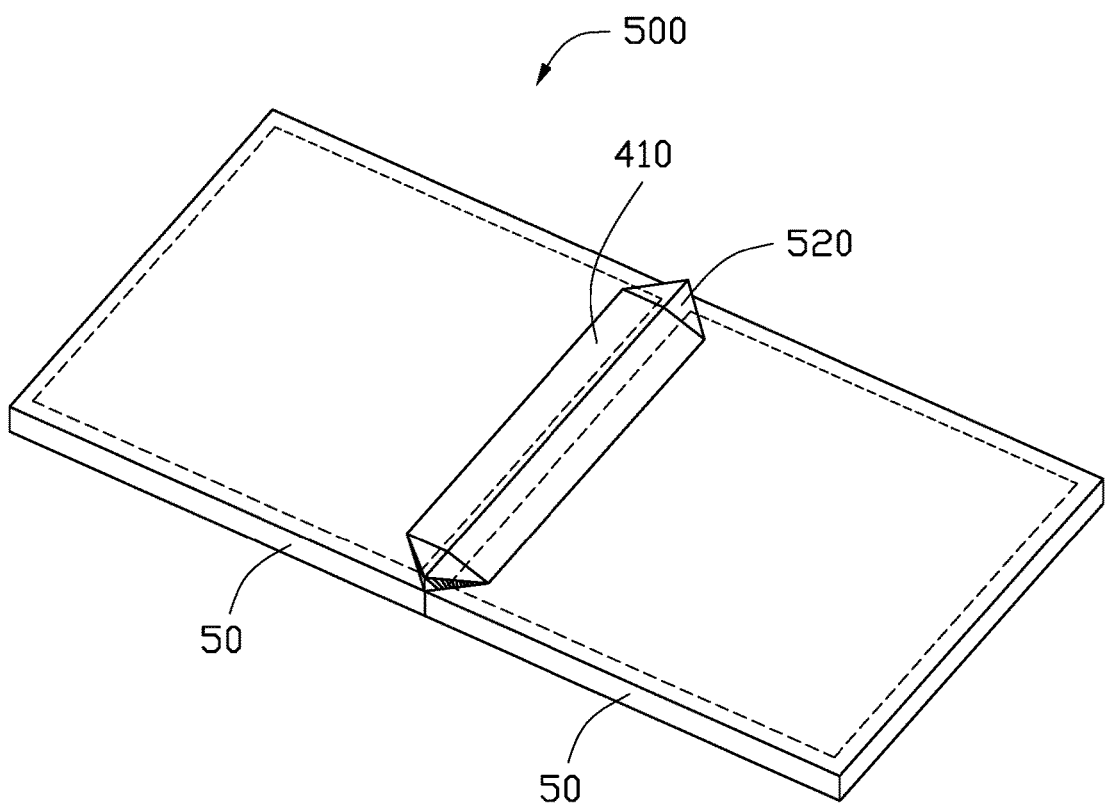
FIG. 26 is a display assembly with two display panels jointed.
Figure 27:
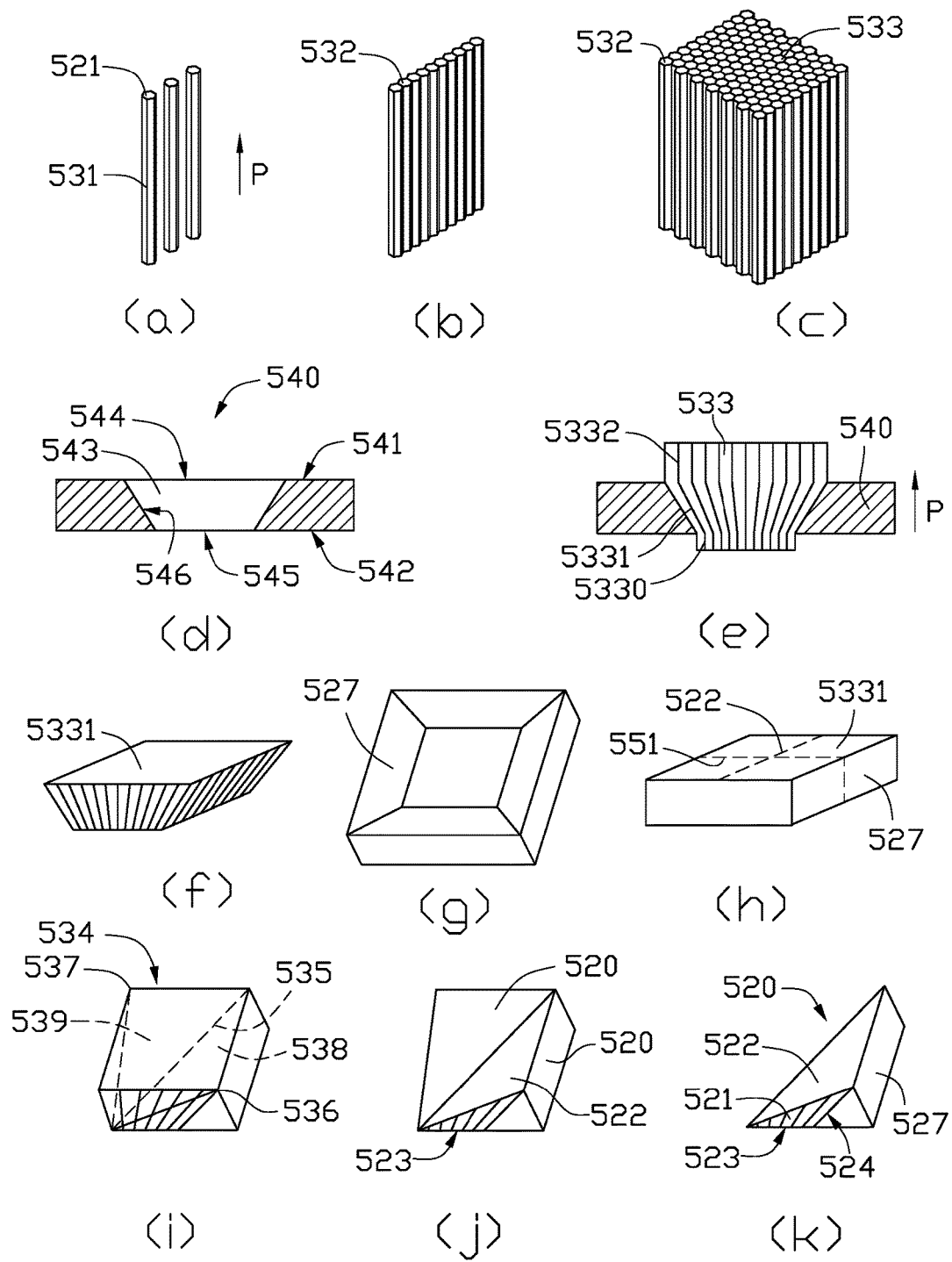
FIG. 27 is a schematic diagram of steps of a first exemplary embodiment of a manufacturing method for manufacturing the image compensating apparatus in FIG. 22.
Figure 28:
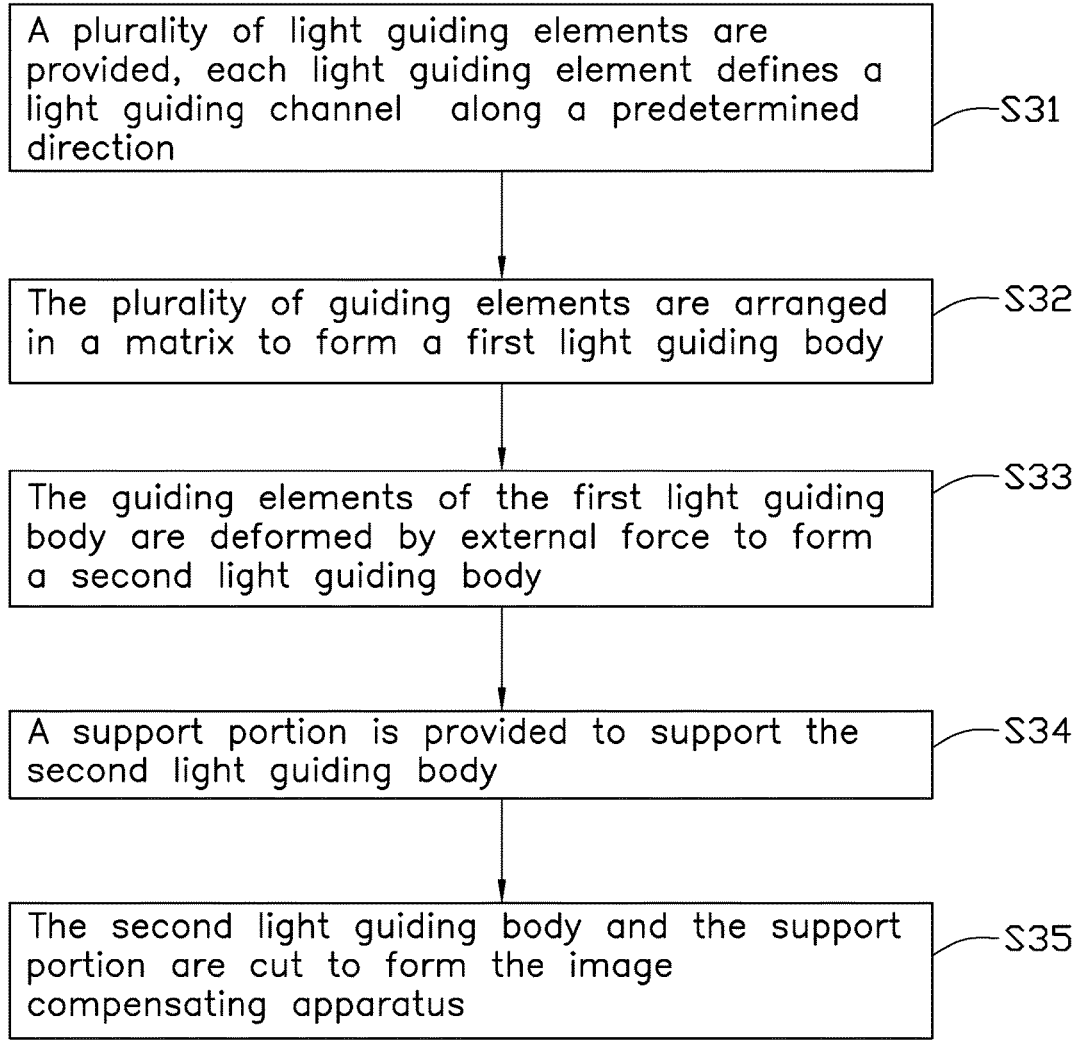
FIG. 28 is a flow chart of the manufacturing method in FIG. 27.

FIG. 25 shows an isometric view of the image compensating apparatus 410, 520 disposed upon the display panel 50 side by side. The compensating portion 526 of the image compensating apparatus 520 is disposed on a periphery display region 53 of the display panel 50, and adjacent to an edge of a non-display region 54. The compensating portion 526 is configured for display image introduced from the periphery display region 53 thereon, and covers the non-display region 54. The support portion 527 may be disposed upon the non-display region 54 and support the compensating portion 526. The length and width of the compensating portion 526 and the support portion 527 may be adjusted according to a requirement of the display panel 50. In one exemplary embodiment, the widths of the light incident surface 523 of the compensating portion 526 are about 10 millimeters. The area of the inclined surface 524 is equal to the area of the supporting surface 527. The widths of the bottom surface 5270, and the connecting surface 5272 may be 5 millimeters. Preferably, the image compensating apparatus 520 may be disposed on the display panel 50 having non-display regions 52 and 54 (border region), with the non-display regions 52 and non-display region 54 each having width of about 5 millimeters, such that the image from the periphery display region 53 is extended on the compensating portion 526, and completely covers the non-display regions 52, 54, thereby displaying image on the display panel 50 without lattice edge. FIG. 26 shows a display assembly 500 jointed from two display panels 50, the image compensating apparatus 410, 520 of the two display panels 50 are disposed on jointing portion of the two display panels 50, thereby displaying image introduced the periphery display region 53 thereon, and covers the non-display regions 52 and 54 (border regions) to accomplish a seamless splice or no black-edge splice of the two display panels 50. The displaying quality of the display assembly 500 is greatly enhanced. The image compensating apparatus 410, 520 used in the display panel 50 enables a plurality of display panel 50 to be spliced in a plane without reducing a displaying quality. Also referring to FIGS. 27 and 28, FIG. 27 is a schematic diagram of steps of a first exemplary embodiment of a manufacturing method for manufacturing the image compensating apparatus 520 shown in FIG. 22. FIG. 28 is a flow chart of steps of the manufacturing method in FIG. 27.

The steps of the manufacturing method of the image compensating apparatus 520 include steps S31-S34. FIGS. 27(a), 27(b), 27(c), 27(f), 27(g), 27(h) 27(i), 27(j) are isometric views, FIGS. 17(d), 17(e) are side views, one skilled in the art can easily understand.

Referring to FIG. 27, and step S31 in FIG. 28, a plurality of light guiding elements 531 are provided, each light guiding element 531 defines a light guiding channel 521 along a predetermined direction P. The light guiding elements 431 are defined by light guiding fibers Referring to FIG. 27(b)-(c), and step S32 in FIG. 28, the plurality of guiding elements 531 are arranged in a matrix to form a first light guiding body 533. The plurality of light guiding elements 531 are divided in a number of groups each arranged in single layer/two layers/a plurality of layer types, to form a plurality of light guiding films 532. The plurality of light guiding films 532 is laminated and adhered together at high temperature to form the first light guiding body 533. In the exemplary embodiment, the light guiding body 533 is cuboid. The predetermined direction P is perpendicular to a top surface and a bottom surface of the cuboid of the first light guiding body 533.

In step S33 in FIG. 28, the guiding elements 531 of the first light guiding body 533 are deformed by external force to form a second light guiding body 5331. That is, a diameter of cross-sectional area of each guiding element 531 of the second light guiding body 5331 decreases from an end to an opposite end of the guiding element 531. In the step S33, the first light guiding body 533 may be pulled or extruded to make the diameter of each guiding element 531 decreases from an end to an opposite end of the guiding element 531. Referring to FIG. 27(d)-(e), in the exemplary embodiment, the first light guiding body 533 is positioned in a refitting mould 540, and extrudes in the refitting mould 540 to enable the first light guiding body 533 to be deformed. The refitting mould 540 defines a first surface 541, a second surface 542, and a cavity 543 cutting through the first surface 541 and the second surface 542. The cavity 543 includes a first opening 544 defined on the first surface 541, a second opening 545 defined on the second surface 542, and four connecting surfaces 546 interconnecting the first surface 541 and the second surface 542. A diameter of the second opening 545 is less than a diameter of the first opening 544, and less than a diameter of cross-sectional area of the first light guiding body 533. In a predetermined temperature, the first light guiding body 533 is positioned in the refitting mould 540 and extruded in the refitting mould 540 to be deformed. The steps are illustrated as follow: the first light guiding body 533 is positioned in the cavity 543 via the first opening 544 and is extruded to expose an end 5330 of the first light guiding body 533 from the second opening 545. Then, the first light guiding body 533 is cut along the first surface 541 and the second surface 542, thereby obtaining the second light guiding body 5331 with the end 5330 and the portion exposed from the first opening 543 removed. The cavity 543 is substantially a frusta rectangular pyramid and the four connecting surfaces 546 are four side surfaces of the frusta rectangular pyramid. The first opening 544 and the second opening 545 are rectangular and respectively correspond to a top surface and a bottom surface of the second light guiding body 5331.

Referring to FIG. 27, the second light guiding body 5331 extruded from the cavity 543 is also substantially a frusta rectangular pyramid. The top surface and the bottom surface of the second light guiding body 5331 are parallel to each other and are rectangular. An area of the top surface is greater than an area of the bottom surface, the predetermined direction P is defined from the bottom surface to the top surface.

Referring to FIGS. 27(g)-(h), and step S34 in FIG. 28, a support portion 527 is provided to support the second light guiding body 5331. The second light guiding body 5331 is received in the support portion 527, and is combined to the support portion 527 by four side surface. In the exemplary embodiment, the second light guiding body 5331 is combined to the support portion 527 by adhesion or lamination at high temperature. The support portion 417 is made of glass.

Referring to FIGS. 27(h)-(k), and step S35 in FIG. 28, the second light guiding body 5331 and the support portion 527 are cut to form the image compensating apparatus 520. The image compensating apparatus 520 includes a light incident surface 523, and a light emitting surface 522 connected to an edge of the light incident surface 523. A projected area of the light emitting surface 522 on the light incident surface 523 is greater than a projected area of the light incident surface 523. The light guiding channel 521 extends from the light incident surface 523 to the light emitting surface 522, and cross-sectional area of each light guiding channel 521 increases from the light incident surface 523 toward the light emitting surface 522. Referring to FIG. 27(h)-(i), the second light guiding body 5331 and the support portion 527 are cut along a first cutting surface 521 and a second cutting surface 552. The first cutting surface 521 is perpendicular to a top of the second light guiding body 5331 and the support portion 527, the second cutting surface 552 is perpendicular to a top of the second light guiding body 5331, the support portion 527, and the first cutting surface 551. The cutting steps for cutting the second light guiding body 5331 and the support portion 527 includes steps: the second light guiding body 5331 and the support portion 527 are cut along the first cutting surface 551 and the second cutting surface 552 to form a first cutting body 534.

Referring to FIG. 27(i)-(j), opposite end points of a top of the first cutting body 534 and a diagonal line 535 of the first cutting body 534 respectively define a third cutting plane 538, and a fourth cutting plane 539. The step of cutting the second light guiding body 5331 further includes steps: the first cutting body 534 is cut along the third cutting plane 538 and the fourth cutting plane 539 to obtain the image compensating apparatus 520. The image compensating apparatus 520 may be used as the periphery image compensating apparatus 212 of in FIGS. 5 and 8. The image compensating apparatus 520 defines two light emitting surfaces 522 cooperatively forming a groove in "V" shape. The groove has a depth decreasing along a direction away from the light incident surface 523. The first cutting body 534 may be cut along the diagonal line 535 firstly to from a pair of symmetrically halves, thereafter cutting along the third cutting plane 538 or the fourth cutting plane 539 to form a half of the image compensating apparatus 520, thus the image compensating apparatus 520 can be used in of FIG. 22, if necessary.

Figure 29:
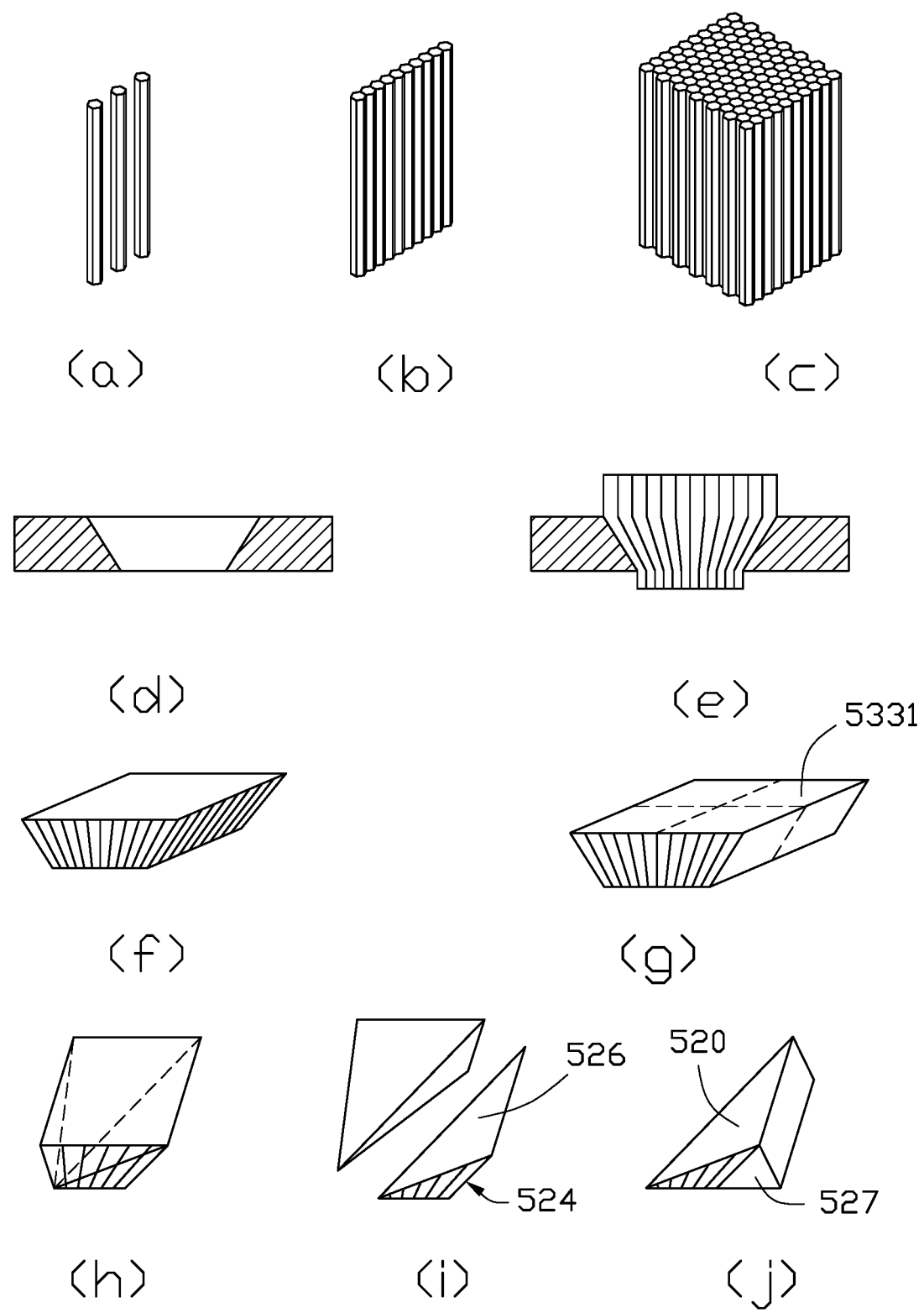
FIG. 29 is a schematic diagram of steps of a second exemplary embodiment of a manufacturing method for manufacturing the image compensating apparatus in FIG. 22.
Figure 30:
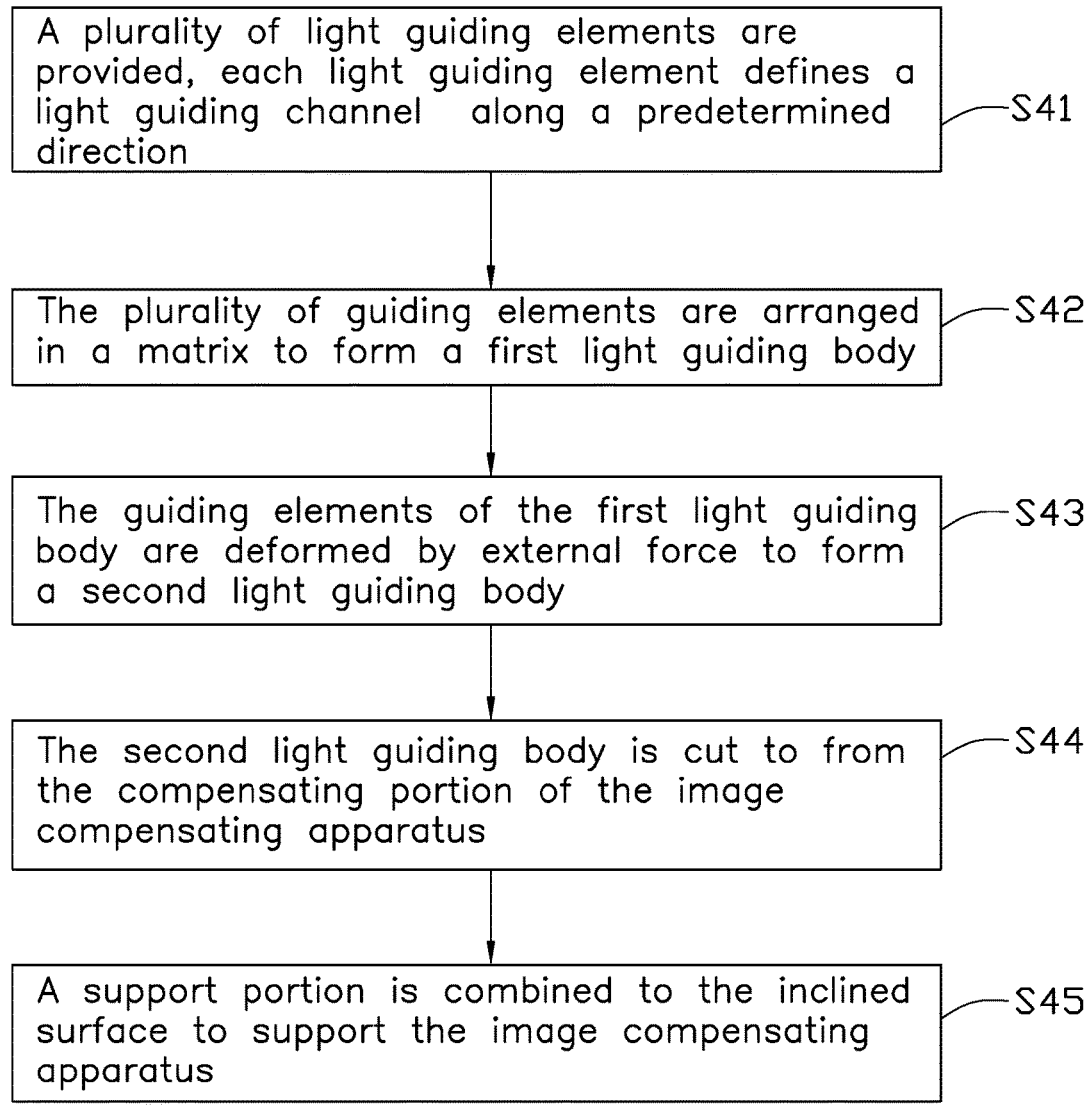
FIG. 30 is a flow chart of the manufacturing method in FIG. 29.

Referring to FIGS. 29-30, FIG. 29 is a schematic diagram of steps of a second exemplary embodiment of a manufacturing method for manufacturing the image compensating apparatus 520 of FIG. 22. FIG. 30 is a flow chart of the manufacturing method of FIG. 29. The difference between the second exemplary embodiment and the first exemplary embodiment of the manufacturing is that: in FIG. 29, the support portion 527 is combined to the image compensating apparatus 520 at the end of the process. In step S44, in FIG. 30, the second light guiding body 5331 is cut to from the compensating portion 526 of the image compensating apparatus 520. In step S45 in FIG. 30, a support portion 527 is combined to the inclined surface 524 to support the image compensating apparatus 520.

The image compensating apparatus 410 and 520 can be disposed on the periphery display regions 41, 53 of the display panel 50, and the image form periphery display regions 41, 53 is introduced into the light incident surfaces 413, 523, and transmitted and expanded to the emitting surfaces 412, 522, thus the image is extended. And in addition, the image expanded on the emitting surfaces 412, 522 cover the non-display regions 42, 52, 54, thereby displaying without black edge.

Furthermore, for display assemblies 400 or 500 jointed from two display panels 40, 50, the images expanded on the emitting surfaces 412, 522 cover the non-display regions 42, 52, 54, thereby displaying images without black edge. The image compensating apparatus 410, 520 used in the display panel 50 enables a plurality of display panels 40, 50 to be spliced in a plane without black edges and without reducing a displaying quality.

The angles and sizes of above described image compensating apparatus 410, 520 may be changed according to a design requirement. The angles and sizes of the image compensating apparatus 410, 520 shown in the present invention are merely for illustrating, not for limiting, one skilled in the prior can easily understand.

Furthermore, a method for manufacturing a display is also provided. The method may include the above steps S11-S14, S21-S24, S31-S35, or S41-S45, and further includes a step S51. In step S51, the image compensating apparatus obtained in the step S14, S24, S35 or S45 is positioned adjacent and corresponding to a periphery display region of the display.

It is to be understood that even though numerous characteristics and advantages of the present exemplary embodiments have been set forth in the foregoing description, together with details of the structures and functions of the exemplary embodiments, the disclosure is illustrative only; and that changes may be made in detail, especially in matters of shape, size, and arrangement of parts, within the principles of the exemplary embodiments, to the full extent indicated by the broad general meaning of the terms in which the appended claims are expressed.

What is claimed is:

1. A method for manufacturing an image compensating apparatus, comprising:
   providing a plurality of light guiding elements, each light guiding element defining a light guiding channel in the guiding element, the light guiding channel extending along a predetermined direction;
   arranging the plurality of light guiding elements in a matrix to form a first light guiding body;
   deforming the first light guiding body to obtain a second light guiding body, each light guiding channel of the second light guiding body has two opposite ends, a cross-sectional area of each light guiding channel of the second light guiding body decreasing from the end to the opposite end; and
   cutting the second light guiding body along at least one cutting plane intersecting the predetermined direction to obtain a compensating portion of the image compensating apparatus, the compensating portion comprising a light incident surface and a light emitting surface, an area of the light emitting surface being greater than an area of the light incident surface, each light guiding channel extending from the light incident surface to the light emitting surface, the cross-sectional area of each light guiding channel increasing along a direction from the first light incident surface to the first light emitting surface.

2. The method of claim 1, wherein each light guiding element is a light guiding fiber.

3. The method of claim 1, wherein the step of arranging the plurality of light guiding elements in the matrix to form the first light guiding body comprises:
arranging and attaching the plurality of light guiding elements into a plurality of light guiding films by adhesion or lamination at high temperature; and
arranging and attaching the plurality of light guiding films to the first light guiding body by adhesion or lamination at high temperature.

4. The method of claim 3, wherein the step of deforming the first light guiding body to obtain a second light guiding body comprises:
extruding the first light guiding body such that a cross-sectional area of each guiding channel decrease from the end to the opposite end and the cross-sectional area of each light guiding channel decreases from the end to the opposite end.

5. The method of claim 4, wherein the step of extruding the first light guiding body to make the cross-sectional of each guiding channel decrease from the end to the opposite end comprises:
positioning the first light guiding body in a refitting mould to deform the first light guiding body at a predetermined temperature.

6. The method of claim 5, wherein the refitting mould comprises a first surface, an opposite second surface, and a cavity defined through the first surface and the second surface; wherein the cavity comprises a first opening defined on the first surface, a second opening defined on the second surface, and four connecting surfaces interconnecting the first surface and the second surface; wherein a diameter of the second opening is less than a diameter of the first opening, the diameter of the second opening is less than a diameter of a cross-sectional of the first light guiding body, the step of positioning the first light guiding body in the refitting mould to deform the first light guiding body in the predetermined temperature comprises:
positioning the first light guiding body in the refitting mould cavity via the first opening;
extruding the first light guiding body to expose an end of the first light guiding body the second opening in the predetermined temperature such that the first light guiding body is deformed; and
cutting the deformed the first light guiding body along the first surface and the second surface to obtain the second light guiding body.

7. The method of claim 6, wherein the second light guiding body is substantially a frustum rectangular pyramid, the top surface and the bottom surface of the second light guiding body are parallel to each other and are rectangular; wherein a surface area of the top surface is greater than a surface area of the bottom surface, and the predetermined direction is defined from the bottom surface to the top surface.

8. The method of claim 7, wherein the step of cutting the second light guiding body along at least one cutting plane to obtain the compensating portion of the image compensating apparatus comprises:
cutting the second light guiding body along a first cutting plane and a second cutting plane to obtain a first cutting body, the first cutting plane being perpendicular to the top surface of the second light guiding body, and the second cutting plane being perpendicular to the top surface of the second light guiding body and the first cutting plane.

9. The method of claim 8, wherein the step of cutting the second light guiding body along at least one cutting plane to obtain the compensating portion of the image compensating apparatus further comprises:
cutting the first cutting body along a third cutting plane and a fourth cutting plane to obtain the compensating portion of the image compensating apparatus, the top surface has opposite end points, the first cutting body has a diagonal line, the third cutting plane and the fourth cutting plane are defined by the opposite end points and the diagonal line.

10. The method of claim 9, wherein the light emitting surface comprises two planar surfaces intersecting with each other, and the two planar surfaces define a V-shaped groove, and a depth of the V-shaped groove decreases along a direction away from the light incident surface.

11. The method of claim 1, wherein each of the light incident surface and the light emitting surface is a planar surface, the light incident surface intersects with the light emitting surface, and the compensating portion further comprises an inclined surface connected between the light incident surface and the light emitting surface.

12. A method for manufacturing a display, comprising:
providing a plurality of light guiding elements, each light guiding element defining a light guiding channel in the guiding element extending along a predetermined direction;
arranging the plurality of light guiding elements in a matrix to form a first light guiding body;
deforming the first light guiding body to obtain a second light guiding body, each light guiding channel of the second light guiding body has two opposite ends, a cross-sectional area of each light guiding channel of the second light guiding body decreasing from the end to the opposite end;
cutting the second light guiding body along at least one cutting plane intersecting the predetermined direction to obtain a compensating portion of an image compensating apparatus, the compensating portion comprising a light incident surface and a light emitting surface, an area of the light emitting surface being greater than an area of the light incident surface, each light guiding channel extending from the light incident surface to the light emitting surface, the cross-sectional area of each light guiding channel increasing along a direction from the first light incident surface to the first light emitting surface; and
positioning the compensating portion of an image compensating apparatus adjacent and corresponding to a periphery display region of the display.

13. The method of claim 12, wherein the step of arranging the plurality of light guiding elements in the matrix to form the first light guiding body comprises:
arranging and attaching the plurality of light guiding elements into a plurality of light guiding films by adhesion or lamination at high temperature; and
arranging and attaching the plurality of light guiding films to the first light guiding body by adhesion or lamination at high temperature.

14. The method of claim 13, wherein the step of deforming the first light guiding body to obtain a second light guiding body comprises:

extruding the first light guiding body such that a cross-sectional area of each guiding channel decrease from the end to the opposite end, such that the cross-sectional area of each light guiding channel decreases from the end to the opposite end.

15. The method of claim 14, wherein the step of extruding the first light guiding body to make the cross-sectional of each guiding channel decrease from the end to the opposite end comprises:

positioning the first light guiding body in a refitting mould to deform the first light guiding body in a predetermined temperature.

16. The method of claim 15, wherein the refitting mould comprises a first surface, an opposite second surface, and a cavity defined through the first surface and the second surface; wherein the cavity comprises a first opening defined on the first surface, a second opening defined on the second surface, and four connecting surfaces interconnecting the first surface and the second surface, a diameter of the second opening is less than a diameter of the first opening, the diameter of the second opening is less than a diameter of a cross-sectional of the first light guiding body, the step of positioning the first light guiding body in the refitting mould to deform the first light guiding body in the predetermined temperature comprises:

positioning the first light guiding body in the refitting mould cavity via the first opening;

extruding the first light guiding body to expose an end of the first light guiding body out of the second opening in the predetermined temperature such that the first light guiding body is deformed; and cutting the deformed the first light guiding body along the first surface and the second surface to obtain the second light guiding body.

17. The method of claim 16, wherein the second light guiding body is substantially a frustum rectangular pyramid, the top surface and the bottom surface of the second light guiding body are parallel to each other and are rectangular, a surface area of the top surface is greater than a surface area of the bottom surface, and the predetermined direction is defined from the bottom surface to the top surface.

18. The method of claim 17, wherein the step of cutting the second light guiding body along at least one cutting plane to obtain the compensating portion of the image compensating apparatus comprises:

cutting the second light guiding body along a first cutting plane and a second cutting plane to obtain a first cutting body, the first cutting plane being perpendicular to the top surface of the second light guiding body, and the second cutting plane being perpendicular to the top surface of the second light guiding body and the first cutting plane.

19. The method of claim 18, wherein the step of cutting the second light guiding body along at least one cutting plane to obtain the compensating portion of the image compensating apparatus further comprises:

cutting the first cutting body along a third cutting plane and a fourth cutting plane to obtain the compensating portion of the image compensating apparatus, the third cutting plane and a fourth cutting plane are defined by opposite end points of the top surface of the first cutting body and a diagonal line of the first cutting body.

20. The method of claim 12, wherein the light emitting surface comprises two planar surfaces intersecting with each other, and the two planar surfaces define a V-shaped groove, and a depth of the V-shaped groove decreases along a direction far away from the light incident surface.

\* \* \* \* \*